US007511683B2

(12) United States Patent
Sumiyoshi

(10) Patent No.: US 7,511,683 B2
(45) Date of Patent: Mar. 31, 2009

(54) INFORMATION DISPLAYING APPARATUS FOR A VEHICLE

(75) Inventor: Kenjiro Sumiyoshi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 716 days.

(21) Appl. No.: 10/810,090

(22) Filed: Mar. 26, 2004

(65) Prior Publication Data

US 2004/0189546 A1    Sep. 30, 2004

(30) Foreign Application Priority Data

| Mar. 26, 2003 | (JP) | ............................. 2003-084760 |
| Mar. 31, 2003 | (JP) | ............................. 2003-095074 |
| Sep. 24, 2003 | (JP) | ............................. 2003-331043 |

(51) Int. Cl.
    *G09G 5/00*    (2006.01)
(52) U.S. Cl. .............................................. 345/7; 345/9
(58) Field of Classification Search ................ 345/7–9, 345/634, 630–633, 629, 635, 636, 13; 359/630, 359/632, 14, 28, 29; 353/14, 28, 29
See application file for complete search history.

(56) References Cited

U.S. PATENT DOCUMENTS

| 5,229,754 | A |   | 7/1993  | Aoki ........................... 340/705 |
| 5,371,510 | A | * | 12/1994 | Miyauchi et al. ............... 345/7 |
| 5,440,428 | A |   | 8/1995  | Hegg et al. .................. 359/630 |
| 5,452,130 | A |   | 9/1995  | Furuya ........................ 359/637 |
| 5,677,701 | A | * | 10/1997 | Okuyama et al. ............... 345/7 |
| 5,845,000 | A | * | 12/1998 | Breed et al. .................. 382/100 |
| 6,289,332 | B2 | * | 9/2001 | Menig et al. ................... 707/1 |
| 6,411,216 | B1 |   | 6/2002 | Fukushima et al. ...... 340/815.4 |
| 6,741,223 | B2 | * | 5/2004 | Kobayashi et al. ............. 345/7 |
| 6,886,956 | B2 | * | 5/2005 | Parker et al. .................. 362/29 |

FOREIGN PATENT DOCUMENTS

| JP | 63-179242   | 11/1988 |
| JP | 07-186778   | 7/1995  |
| JP | 2000-146598 | 5/2000  |
| JP | 2001-113981 | 4/2001  |

* cited by examiner

*Primary Examiner*—Ricardo L Osorio
(74) *Attorney, Agent, or Firm*—J.C. Patents

(57) ABSTRACT

The present invention is an information displaying apparatus for a vehicle, which includes a cluster disposed to be faced to an occupant; and a display device disposed in the cluster; the display device includes a displaying surface on which information on the vehicle is displayed, and a plurality of reflecting mirror members which have a distance from each other and disposed forward of the occupant, for allowing the occupant to see the vehicle information by reflecting the vehicle information displayed on the displaying surface, wherein the vehicle information reflected by a reflecting mirror member provided far from the occupant is configured to be visible by the occupant by transmitting a reflecting mirror member provided near to the occupant, and an area where does not overlap with the vehicle information reflected by the reflecting mirror member provided far from the occupant is provided at a proximity of periphery of the reflecting mirror member provided near to the occupant.

14 Claims, 26 Drawing Sheets

INFORMATION DISPLAYING APPARATUS FOR A VEHICLE

BACKGROUND OF THE INVENTION

1. Field of the Invention

The present invention relates to an information displaying apparatus for a vehicle which allows an occupant to see information on the vehicle displayed on a displaying device by reflecting the vehicle information on a plurality of reflecting mirror members.

2. Description of the Related Art

Heretofore, there has been known an information displaying apparatus for a vehicle such as an automobile, which is mounted on the vehicle, for example, as disclosed in JP-A 2001-113981, (see FIG. 28).

First of all, to explain from a structure thereof, such a conventional information displaying apparatus for the vehicle is provided with an instrument panel 2 extending along a direction of width of the vehicle at front of a driver seat in a vehicle interior 1, and a multi-display device 3 structured by a liquid crystal displaying device or a CRT device located at a center portion of the instrument panel in the direction of vehicle width between the driver seat and a passenger seat.

The multi-display device 3 is provided with a multi-display screen 3c disposed at an opening 3b of a cluster 3a provided at an upper part of the instrument panel 2 so as to enable the occupant to see the screen 3c.

In addition, a speed displaying portion 4 for displaying speed, and a switch-screen displaying portion 5 which displays information on a map or the like of a navigation device, and at the same time, displays, by means of a switching-over operation, a group of operating switches and information on in-vehicle devices such as an audio or an air-conditioning equipment, are provided in the multi-display screen 3c. The speed displaying portion and the switch-screen displaying portion arc combined in the multi-display screen, and the multi-display screen displays those speed displaying portion and the switch-screen displaying portion within one screen thereof.

Furthermore, an operating portion 7 for controlling and commanding the respective car-mounted devices by suitably selecting and executing the group of operating switches displayed on the switch-screen displaying portion 5 is provided in a center cluster portion 6 provided below the multi-display device 3.

Also, in such an information displaying apparatus for a vehicle shown in FIG. 29, a panel-display device 9 is stored with directing a displaying surface 9a thereof toward an upward direction in a cluster 8 as a storage portion provided on the instrument panel 2.

At the displaying surface 9a of the panel-display device 9, a plurality of reflecting mirror members 10a, 10b and 10c for allowing an occupant to see information on the vehicle displayed on the displaying surface 9a from the vehicle interior by reflecting the vehicle information, are provided having a certain distance to each other.

Next, an operation of those conventional information displaying apparatuses for the vehicle will be explained.

In the conventional information displaying apparatus for the vehicle shown in FIG. 28 structured as described above, since the multi-display device 3 and the operating portion 7 are provided separately from each other, an amount of movement in line of sight of the occupant when viewing the speed displaying portion 4 of the multi-display device 3 while the vehicle moves is less, and it is possible to operate the operating portion 7 provided in the center cluster portion 6 at a near position where hand of the occupant seated in the driver seat can be reached thereto.

In addition, in the information displaying apparatus for the vehicle shown in FIG. 29, when the vehicle information are displayed in respective areas L1-L3 of the displaying surface 9a of the panel-display device 9, the vehicle information displayed on the displaying surface 9a are respectively reflected by the reflecting mirror members 10a, 10b and the reflecting mirror member 10c, thereby the vehicle information are seen and recognized by the occupant in the vehicle interior 1 as a representation which the occupant can see them stereoscopically.

Accordingly, in a case of the information displaying apparatus for the vehicle shown in FIG. 28, it is possible to display a plurality of vehicle information at a time by overlapping them, by facing the multi-display screen provided with the speed displaying portion 4 and the switch-screen displaying portion 5 toward the vehicle interior 1 from the opening 3b of the cluster 3a.

However, in the conventional information displaying apparatus for the vehicle shown in FIG. 29, since it is structured such that each of the vehicle information displayed in the respective areas L1-L3 of the displaying surface 9a of the panel-display device 9 are reflected by the reflecting mirror members 10a, 10b and 10c, which are respectively disposed by having the certain distance from each other, there has been a problem that the vehicle information are overlapped mutually and thus become difficult to see them, if a plurality of reflecting mirror members 10a are used in those reflecting mirror members.

Particularly, if number of reflecting mirror members is increased, a problem occurs that a great deal of vehicle information are overlapped mutually and thus become difficult to see them. even. more.

Furthermore, as shown in FIG. 28, if the panel-display device 9 shown in FIG. 29 is placed and used at the center portion of the instrument panel 2 positioned in the direction of vehicle width between the driver seat and the passenger seat, an opening 8a of the cluster 8 have to be directed toward the driver seat, and displacement of displaying between each of the front and rear reflecting mirror members 10a, 10b and 10c have to be reduced.

In addition, in the conventional information displaying apparatus for the vehicle shown in FIG. 28, since the multi-display screen provided with the speed displaying portion 4 and the switch-screen displaying portion 5 is faced from the opening 3b of the cluster 3a toward the vehicle interior 1, there is a limitation in a display area and thus it is difficult to increase an amount of information of the vehicle information that can be displayed.

Particularly, if a portion for displaying the vehicle information is provided in the center cluster 6 provided below the cluster 3a, the amount of movement in line of sight between a line of sight toward a front of the vehicle of the occupant and a viewpoint to see that displaying portion becomes large. Thus a problem occurs that it becomes difficult to provide visibility thereof to be fine.

Furthermore, in the conventional information displaying apparatus for the vehicle shown in FIG. 29, if the number of reflecting mirror members 10a, 10b . . . and so on is increased, a problem rises that a dimension in a direction of height of a displaying portion visible from the vehicle interior 1 by the occupant becomes less.

In addition, in the conventional information displaying apparatus for the vehicle shown in FIG. 29, since displaying in the area L3 which is positioned far from the occupant in the displaying surface 9a of the panel-display device 9 is recognized and seen from the opening 8a of the cluster 8 after transmitting the reflecting mirror members 10a and 10b, there has been a problem that a luminance in the displaying is faded when the displaying transmits the reflecting mirror members 10a and 10b which are near from the occupant.

Furthermore, there is a case in which a display position of the displaying surface 9a cannot be changed in order to simplify the structure of the apparatus. In such a case, an order of the displaying of the panel-display device 9 seen from the occupant cannot be changed, and thus it is difficult to accentuate the vehicle information which is desired to be emphasized.

SUMMARY OF THE INVENTION

Therefore, it is an object of the present invention to provide an information displaying apparatus for a vehicle capable of allowing visibility to be fine even if a plurality of reflecting mirror members are used.

It is another object of the present invention to provide an information displaying apparatus for a vehicle capable of reducing an amount of movement in line of sight of an occupant and improving visibility by increasing an effective display area where visible, even if a plurality of reflecting mirror members arc used.

It is yet another object of the present invention to provide an information displaying apparatus for a vehicle in which a luminance in displaying is homogenized regardless of whether displaying exists near to or far from an occupant, and which the luminance in the displaying can be changed as need arises.

To solve the above-mentioned problems, the present invention is an information displaying apparatus for a vehicle which comprises a cluster disposed to be faced to an occupant; and a display device disposed in the cluster; the display device includes a displaying surface on which information on the vehicle is displayed, and a plurality of reflecting mirror members which have a distance from each other and disposed forward of the occupant, for allowing the occupant to see the vehicle information by reflecting the vehicle information displayed on the displaying surface, wherein the vehicle information reflected by a reflecting mirror member provided far from the occupant is configured to be visible by the occupant by transmitting a reflecting mirror member provided near to the occupant, and an area where does not overlap with the vehicle information reflected by the reflecting mirror member provided far from the occupant is provided at a proximity of periphery of the reflecting mirror member provided near to the occupant.

DESCRIPTION OF THE PREFERRED EMBODIMENTS

First Embodiment

Figure 1:
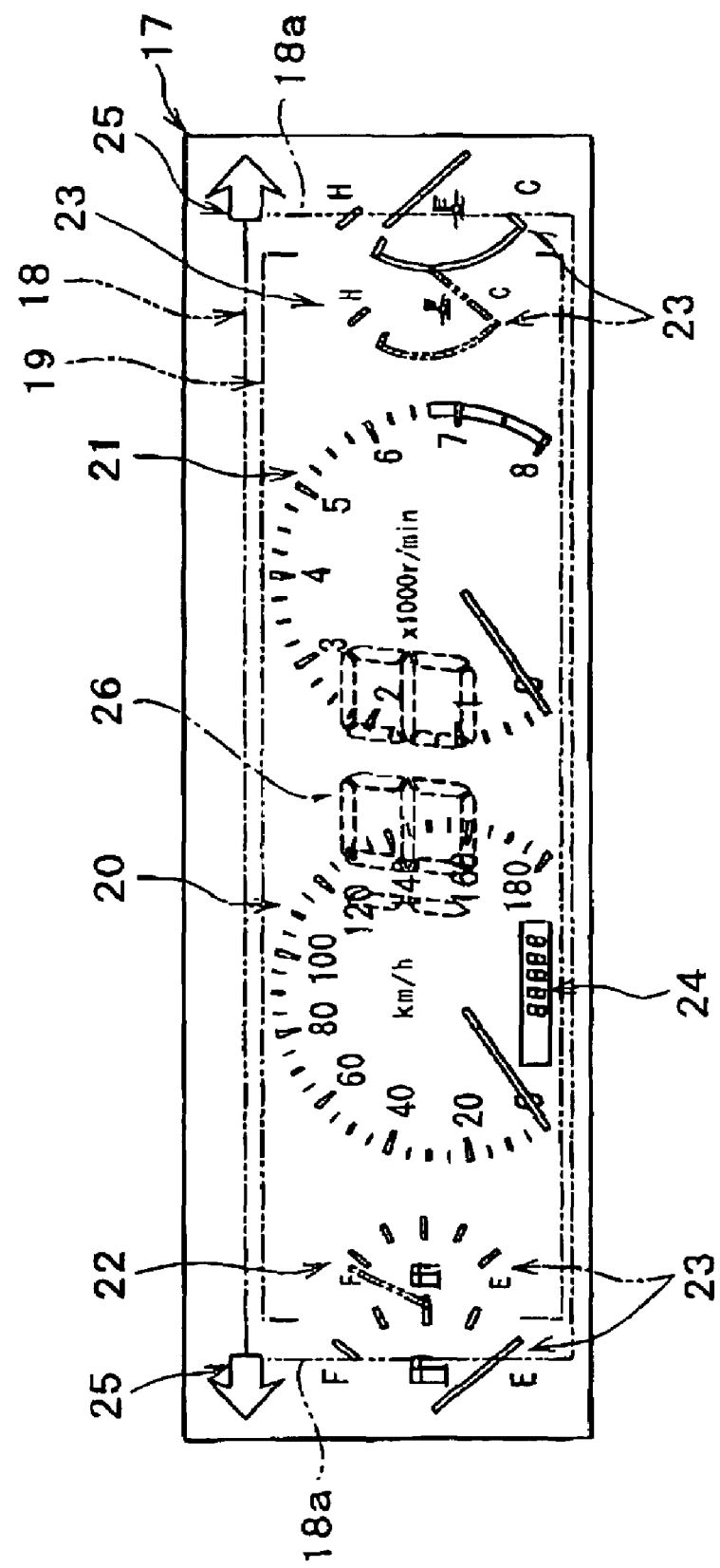
FIG. 1 is a front view showing an information displaying apparatus for a vehicle according to a first embodiment of the present invention and also schematically showing respective displays which an occupant seated in a driver seat sees and recognizes.

FIGS. 1-9 show an information displaying apparatus for a vehicle according to a first embodiment of the present invention.

Meanwhile, parts in the present embodiment, which are same or equivalent to the above-mentioned conventional apparatuses, will be explained by attaching same reference numerals used therein.

First of all to explain from a structure, in the information displaying apparatus for the vehicle according to the first embodiment, an instrument panel 2 as a vehicle-body member is provided at front of a driver seat 13 and is extended along a direction of width of the vehicle in a vehicle interior 1.

In the instrument panel 2, an information displaying device 15 is mounted on an upper surface and at front of the driver seat 13 with upwardly projecting a cluster 15a as a storage portion formed to be integral, with the vehicle-body member.

A panel-display device 16 as a display device is stored with a condition that a displaying surface 16a thereof is laid substantially horizontally and directed upwardly inside of the cluster 15a.

The panel-display device 16 in the first embodiment is provided with a plurality of backlights 16b . . . at a back surface of the panel-display device.

Also, two half-mirror members 17 and 18 for reflecting light partly and having half-permeability, and a mirror member 19, which are as reflecting mirror members, are provided in the cluster 15a at an upper part of the displaying surface 16a of the panel-display device 16, from a position near to an occupant to a position far from the occupant. Thus, they are configured to reflect information on the vehicle displayed in respective areas L1, L2 and L3 of the displaying surface 16a so that the vehicle information can be seen from the occupant.

Figure 3:
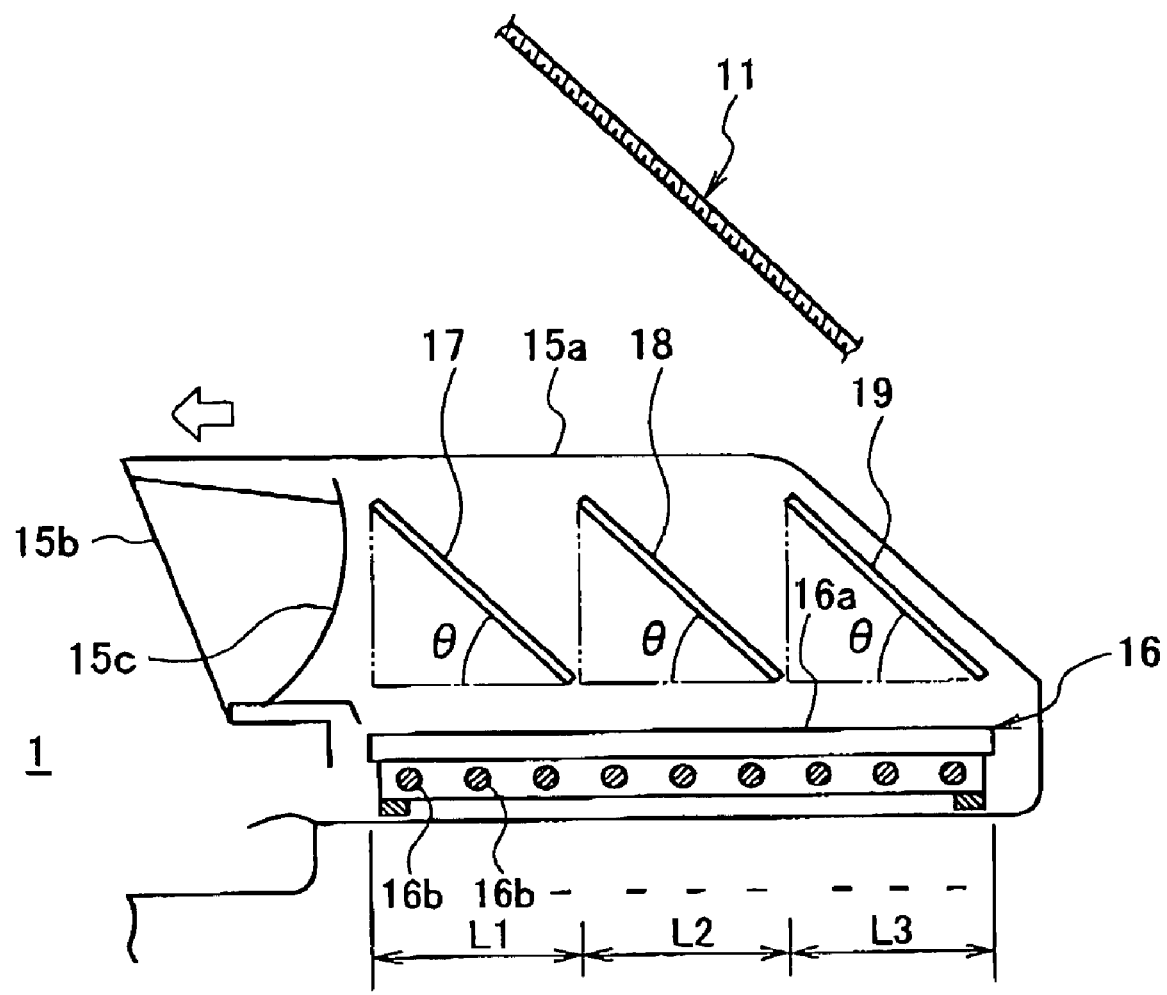
FIG. 3 is a cross-sectional view taken along A-A line in FIG. 2 according to the first embodiment.

These half-mirror members 17 and 18, and the mirror member 19 each has a rectangular shape which is horizontally long if seen from front, and they are arranged to be in parallel along the displaying surface 16a by being set in a certain distance from each other. In addition, as shown in FIG. 3, a certain angle of gradient θ (θ=45 degrees) is given to each of the half-mirror members 17 and 18, and the mirror member 19, and they are attached to an inner wall of the cluster 15a respectively, so as to be slanted.

Attached to a front surface opening 15b of the cluster 15a is a front cover member 15c made of a transparent member which is formed to be incurved in a concaved shape so that a reflection from the vehicle interior is prevented.

Also, the displaying surface 16a is connected with a display controlling portion which is not shown, thereby it is configured that displaying of the vehicle information on the displaying surface 16a is controlled by controlling, for example, a position where the displaying is reflected, and a kinds of displaying such as colors and size thereof, when reflecting and displaying the various vehicle information of the vehicle on the respective half-mirror members 17 and 18 and the mirror member 19.

Figure 5:
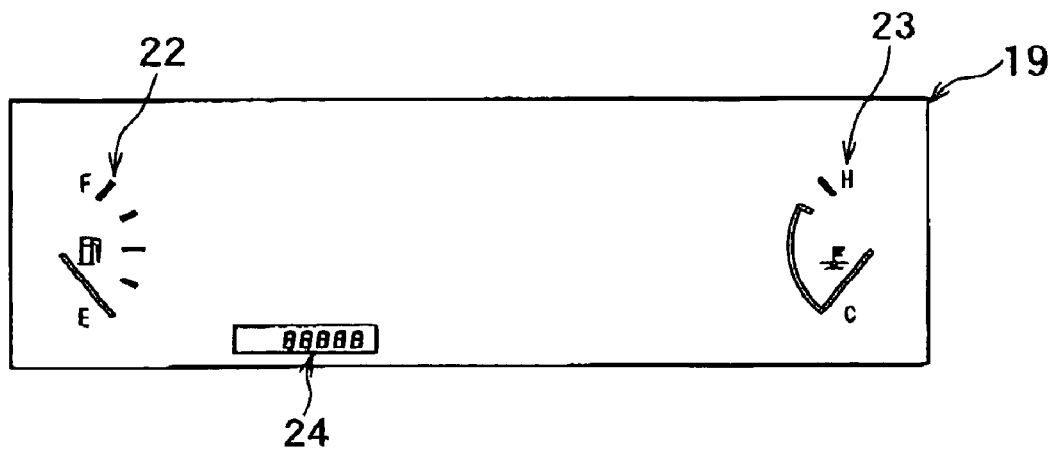
FIG. 5 is a front view showing one example of a display reflected and displayed on a mirror member at a normal time according to the first embodiment.

More specifically, if the display controlling portion carries out predetermined displaying on the area L3 of the displaying surface 16a, as shown in FIG. 5, displaying of fuel gauge 22 and displaying of coolant temperature gauge 23 are normally reflected and displayed respectively at proximity of periphery of left and right edges of the mirror member 19 provided farthest from the occupant. In addition, displaying of an odd/trip meter 24 is reflected and displayed at proximity of a lower edge of the mirror member 19 such that the displaying thereof becomes as an erected image if seen from the occupant.

Figure 6:
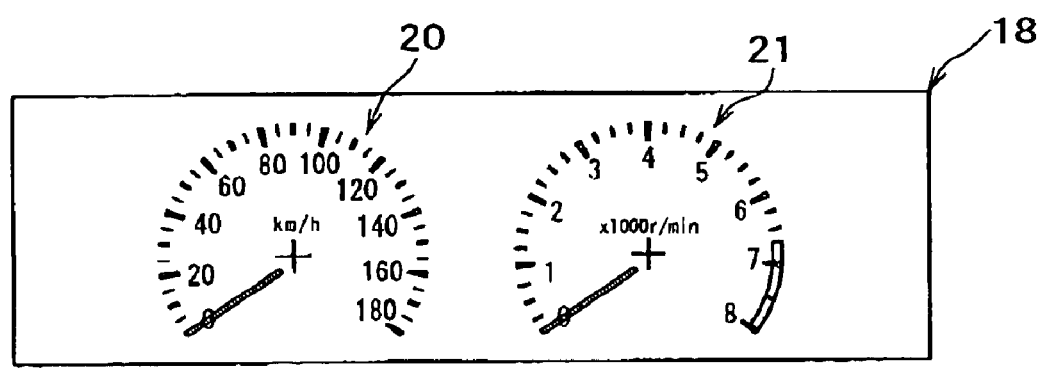
FIG. 6 is a front view showing one example of a display reflected and displayed on a half-mirror member located far from the occupant according to the first embodiment.

If the display controlling portion carries out predetermined displaying on the area L2 of the displaying surface 16a, as shown in FIG. 6, displaying of a speed meter 20 and displaying of a tachometer 21 as a vehicle information display are reflected and displayed at substantially center and in the vehicle-width direction of the half-mirror member 18 provided at center or far from the occupant, so that they become as the erected image if seen front the occupant.

Figure 7:
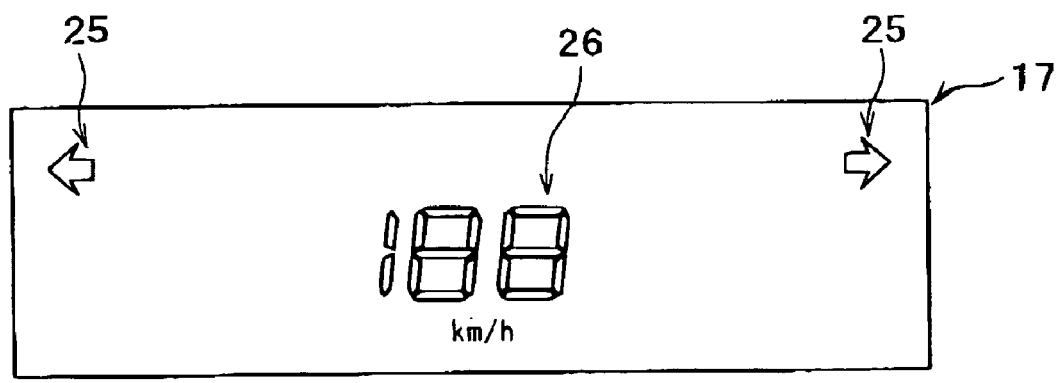
FIG. 7 is a front view showing one example of a display reflected and displayed on a half-mirror member located near to the occupant according to the first embodiment.

In addition, the display controlling portion carries out a displaying control for performing predetermined displaying so that direction-indicating displays 25 and 25 as an other vehicle information display are reflected and displayed at proximity of periphery of left and right edges of the half-mirror member 17 located near from the occupant at positions where the direction-indicating displays do not overlap with the speed meter displaying 20 and the tachometer displaying 21, or the fuel gauge displaying 22 and the coolant temperature gauge displaying 23, as shown in FIG. 7.

Furthermore, in the first embodiment, it is configured that displaying of digital speed meter 26 is displayed at substantially center of the half-mirror member 17 in the direction of vehicle-width with the speed meter displaying 20 and the tachometer displaying 21 of the half-mirror member 18, alternatively.

In the first embodiment, as shown by a solid line in FIG. 1, the fuel gauge displaying 22 is enlarged and displayed at proximity of periphery of left edge of the half-mirror member 17 which is nearest if seen from the occupant as the other vehicle information display, in such a manner that the fuel gauge displaying does not overlap with the speed meter displaying 20 and the tachometer displaying 21, if a remaining amount of fuel is reduced less than a certain remaining amount.

Furthermore, in the first embodiment, as shown by a solid line in FIG. 1, the coolant temperature gauge displaying 23 is configured to be enlarged and displayed at proximity of periphery of right-left edges of the half-mirror member 17 which is nearest seen from the occupant as the other vehicle information display, such that the coolant temperature gauge displaying does not overlap with the speed meter displaying 20 and the tachometer displaying 21, if a water temperature has raised over a certain temperature.

Also in the first embodiment, a display for notifying approaching of ETC (Electronic Toll Collection) which is to inform the occupant that the vehicle approaches to a gate of the ETC is configured to be displayed on the displaying surface 16a and to be reflected and displayed on the respective half-mirror members 17 and 18 and the mirror member 19, as the other vehicle information display. Here, the display for notifying approaching of the ETC is, for example, a pictorial diagram which schematically shows a shape of the ETC gate.

Figure 9:
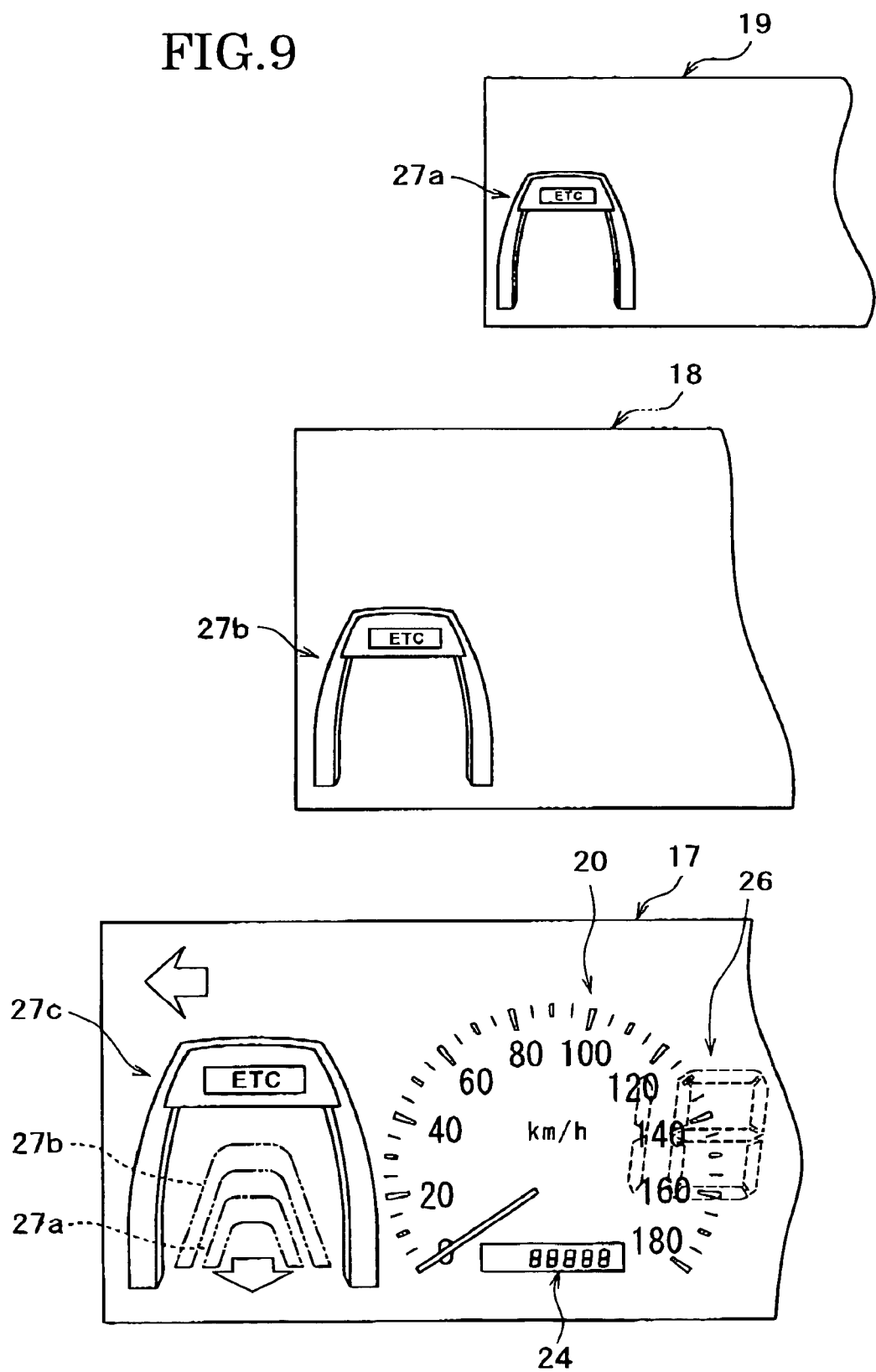
FIG. 9 is a schematic view showing one example of a display which pictorial diagrams as a display for notifying approaching of ETC (Electronic Toll Collection) are sequentially reflected and displayed on the members from the far mirror member located to the near half-mirror member located according to the first embodiment.

More specifically, as shown in FIG. 9, pictorial diagrams 27a, 27b and 27c which are schematically show the shape of the ETC gate as the ETC approximation-notification display, are displayed at proximity of left edges of the respective half-mirror members 17 and 18 and the mirror member 19 in such a manner that the pictorial diagrams do not overlap with the speed meter displaying 20.

The pictorial diagrams 27a, 27b and 27c are configured, to be reflected and displayed on the mirror member 19 located far from the occupant when the ETC gate is far away from the vehicle, and are configured to be sequentially reflected and displayed on the half-mirror member 18 located at near or center from the occupant and the half-mirror member 17 located nearest from the occupant, when the ETC gate approaches.

In the first embodiment, it is configured that a size of displaying of the pictorial diagrams 27a, 27b and 27c is also changed. When the ETC gate is far away from the vehicle, the pictorial diagram 27a is configured to be displayed on the mirror member 19 relatively small, and when the ETC gate approaches, the pictorial diagrams 27b and 27c, which are gradually-larger than the displaying of the pictorial diagram 27a showing that the ETC gate is away from the vehicle, are configured to be displayed on the half-mirror member 18 located center or near from the occupant and the half-mirror member 17 located nearest from the occupant.

Furthermore in the first embodiment, the displaying of those pictorial diagrams 27a, 27b and 27c are configured to become gradually larger according to the approximation of the vehicle toward the ETC gate while the pictorial diagrams are displayed on the respective half-mirror members 17 and 18, and the mirror member 19.

Figure 2:
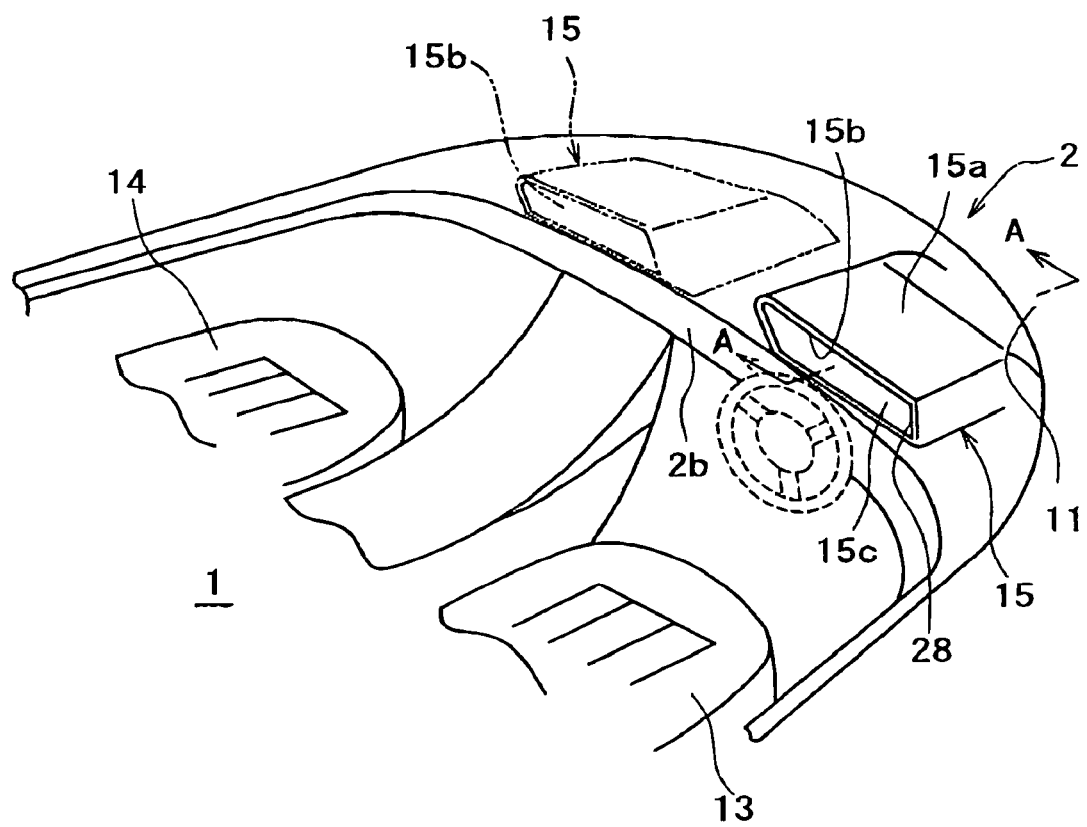
FIG. 2 is a schematic perspective view showing the information displaying apparatus for the vehicle according to the first embodiment and also explaining a structure inside of a vehicle interior.
Figure 4:
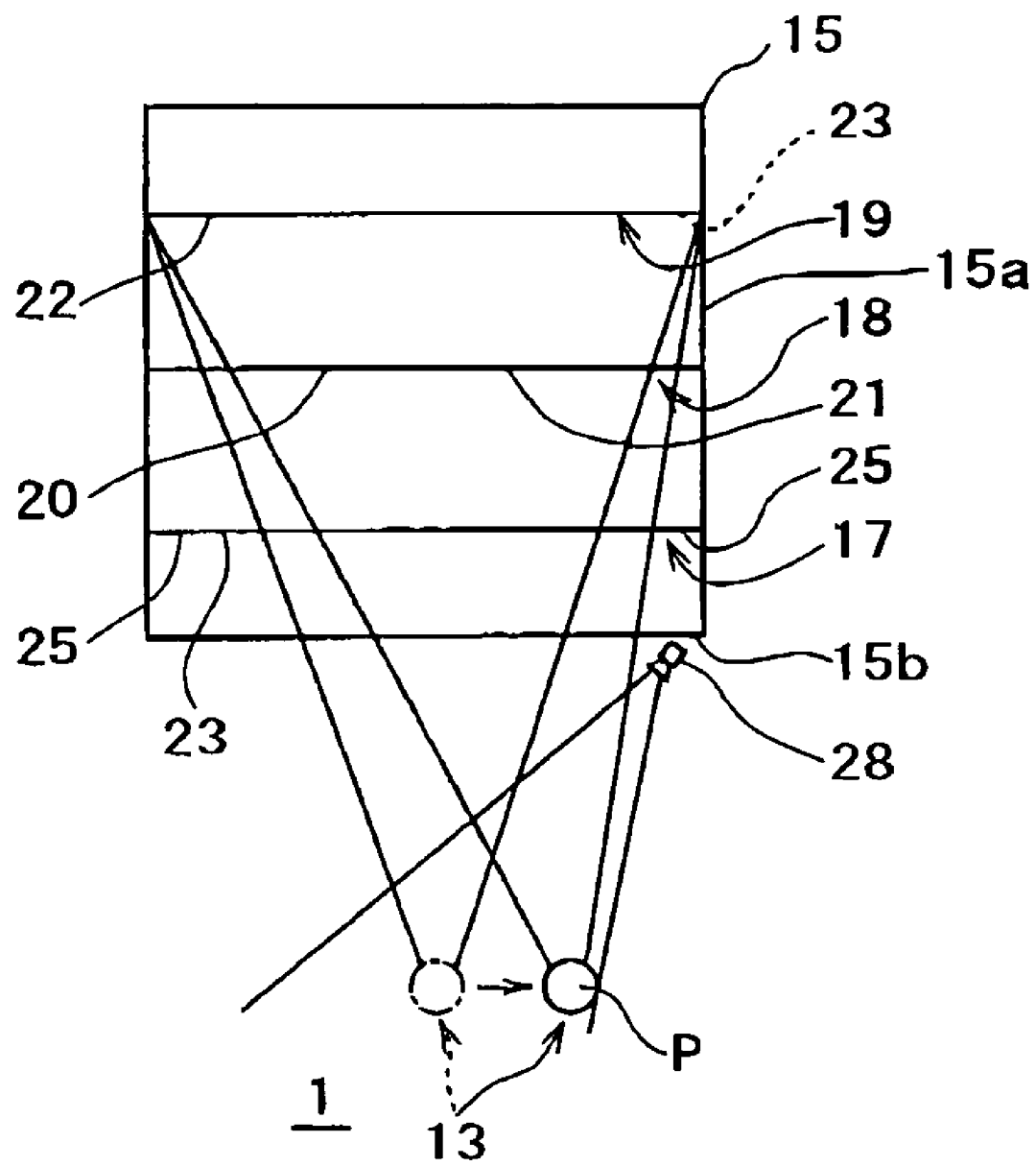
FIG. 4 is a schematic plain view explaining a condition which eyepoint of the occupant moves according to the first embodiment.

Also, in the information displaying apparatus for the vehicle in the first embodiment, as shown in FIGS. 2 or 4, a CCD camera 28 as an eyepoint detecting means for detecting an eyepoint of an occupant P is provided at periphery of the vehicle interior opening 15b of the cluster 15a located at front of the driver seat 13.

A position of the eyepoint is recognized based on an image of a face of the occupant P seated in the driver seat 13 imaged by the CCD camera 28, and a display position of the vehicle information display or the other vehicle information display is configured to be changed according to a movement of the eyepoint.

Figure 8:
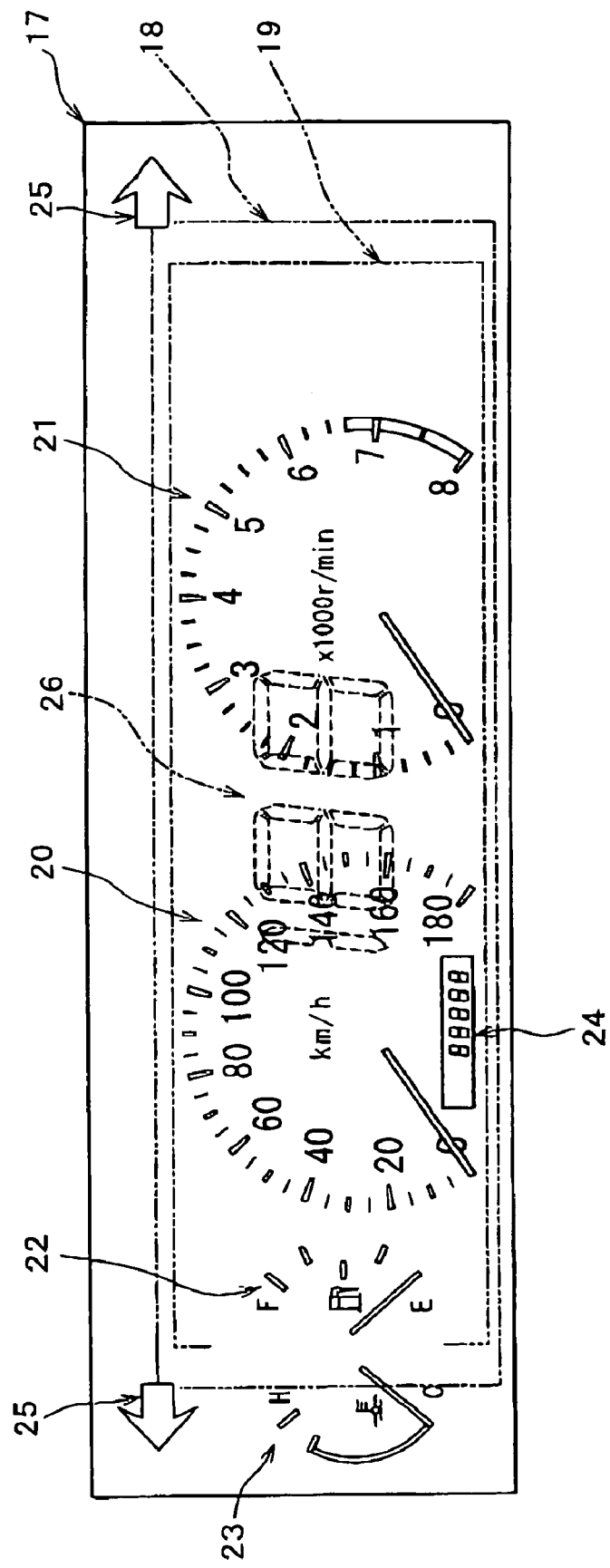
FIG. 8 is a front view showing one example of a display when the eyepoint is moved to right according to the first embodiment.

In the first embodiment, when the eyepoint of the occupant P is moved to right, the coolant temperature gauge displaying 23 displayed at the proximity of periphery of right edge of the half-mirror member 19 is configured to be displayed on proximity of periphery of left edge of the half-mirror member 17 positioned nearest from the occupant as shown in FIG. 8, so as to be seen easily.

Next, an operation of the first embodiment will be explained.

In the first embodiment, the displaying control for the displaying surface 16a of the panel-display device 16 is carried out by the display controlling portion so that an image is displayed in the area L2, thereby the speed meter displaying 20 and the tachometer displaying 21 are reflected and displayed on substantially the center of the half-mirror member 18 provided far from the occupant.

These speed meter displaying 20 and tachometer displaying 21 are seen and recognized by the occupant seated in the driver seat inside of the vehicle interior 1 by transmitting the half-mirror member 17 located near from the occupant.

As described above, since the speed meter displaying 20 and the tachometer displaying 21 are displayed on the far half-mirror member 18, it is easy to set a certain distance between the occupant and the vehicle information display. Accordingly, it is possible to set an amount of movement in line of sight when seeing the vehicle information display to be less, and thus visibility is fine.

In addition, the displaying control for the displaying surface 16a is carried out by the display controlling portion so that an image is displayed on the area L1, thereby the direction-indicating displays 25 and 25 are reflected and displayed at the proximity of periphery of left and right edges of the half-mirror member 17 located from the occupant at positions where the direction-indicating displays do not overlap with the speed meter displaying 20 and the tachometer displaying 21.

Since the direction-indicating displays 25 and 25 are reflected and displayed on the half-mirror member 17 located near from the occupant, it is possible to display the direction-indicating displays 25 and 25 at positions nearest to the occupant with relatively large size.

Furthermore, since the direction-indicating displays 25 and 25 are displayed at the proximity of periphery of left and right edges of the half-mirror member 17 located near from the occupant, it is easy to understand intuitively that the displaying thereof are direction indicator for left and direction indicator for right.

At this time, as shown in FIG. 1, the periphery of left and right edges of the near half-mirror member 17 is positioned outside as compared with left and right edges 18a of the far half-mirror member 18, if seen from the occupant P seated in the driver seat 13.

Accordingly, the direction-indicating displays 25 and 25 displayed near from the occupant do not overlap furthermore with the speed meter displaying 20 and the tachometer displaying 21 displayed on the far half-mirror member 18 and the fuel gauge displaying 22 and the coolant temperature gauge displaying 23 reflected and displayed on the mirror member 19.

Therefore, it is possible to maintain the fine visibility even when the plurality of half-mirror members 17 and 18 and the mirror member 19 are used.

In the first embodiment, as shown by the solid line in FIG. 1, the fuel gauge displaying 22 is enlarged and displayed at the proximity of periphery of left edge of the half-mirror member 17 which is nearest from the occupant as the other vehicle information display such that the fuel gauge displaying does not overlap with the speed meter displaying 20 and the tachometer displaying 21, when the remaining amount of fuel is reduced less than the certain remaining amount.

Furthermore in the first embodiment, as shown by the solid line in FIG. 1, the coolant temperature gauge displaying 23 is configured to be enlarged and displayed at the proximity of periphery of right-left edge of the half-mirror member 17 which is nearest from the occupant as the other vehicle information display in such a manner that the coolant temperature gauge displaying does not overlap with the speed meter displaying 20 and the tachometer displaying 21, if the water temperature has raised over the certain temperature.

As described above, the fuel gauge displaying 22 and the coolant temperature gauge displaying 23 are displayed at the proximity of periphery of left and right edges of the farthest mirror member 19 in a normal condition as shown by a two-dot chain line in FIG. 1. However, if there is a necessity of call the occupant's attention such as the reduction in the remaining amount of fuel and the rise in the water temperature, the fuel gauge displaying and the coolant temperature gauge displaying are to be displayed at the position nearest to the occupant with relatively large size as a warning display, thus it is possible to call the occupant's attention.

In addition, when the vehicle approaches to the ETC gate from the distance away from the gate, at first, the pictorial diagram 27a as the ETC approximation-notification display is reflected and displayed small on the far mirror member 19, and next, the pictorial diagrams 27b and 27c are sequentially enlarged and reflected to be displayed on the far half-mirror member 18 and the near half-mirror member 17, one right after the other, as shown in FIG. 9.

Accordingly, since the pictorial diagrams 27a and 27b, which are visible from the occupant by transmitting the half-mirror member 17 and which are for displaying the ETC gate schematically, can be seen even in the cluster 15a as if they move and approach toward the occupant, it is easy to recognize that the ETC gate approaches.

Furthermore, when the vehicle approaches to the ETC gate from the distance away from the gate, at first, the pictorial diagram 27a showing the ETC gate is displayed relatively small, and next, the pictorial diagrams 27b and 27c which are larger than the displaying in the case when the ETC gate is far away from. the vehicle are reflected and displayed on the half-mirror members 18 and 17 while being enlarged sequentially.

Accordingly, in the cluster 15a, since the pictorial diagrams 27a, 27b and 27c for displaying the ETC gate schematically can be seen as if they approach toward the occupant, it is easy to recognize that the ETC gate approaches.

The displaying of each of the pictorial diagrams 27a, 27b and 27c are configured to be gradually larger, respectively, according to the approximation of the vehicle toward the ETC gate while displayed on the respective half-mirror members 17 and 18 and the mirror member 19, and they are configured to be enlarged until a size in each of the pictorial diagrams becomes as a size that the occupant can see and to be enlarged so that largest size in displaying thereof become substantially a same size with the size of the pictorial diagrams 27b or 27c displayed nearer to the occupant than the displaying which is enlarged to be its largest size.

Accordingly, since the displaying continues smoothly when the pictorial diagram 27a reflected and displayed on the mirror member 19 is changed over to the pictorial diagram 27b reflected and displayed on the half-mirror member 18, and also, the displaying is carried out consecutively and smoothly when the pictorial diagram 27b reflected and displayed on the half-mirror member 18 is changed over to the pictorial diagrams 27c reflected and displayed on the half-mirror member 17, the visibility is fine even more.

In addition, as shown in FIG. 4, when the CCD camera 28 detects the eyepoint of the occupant P, the display position of the vehicle information display or the other vehicle information display is changed to the position easier to see, according to the movement of the eyepoint.

In the first embodiment, as shown in FIG. 4, when the eyepoint of the occupant P is moved to the right, the display position of the coolant temperature gauge displaying 23 is changed from the position at the proximity of periphery of the right edge of the mirror member 19 shown by a two-dot chain line to a position at the proximity of periphery of the left edge of the half-mirror member 17 where easier to see shown by a solid line in FIG. 8

At this Lime, since the coolant temperature gauge displaying 23 is reflected and displayed at the proximity of periphery of left edge of the half-mirror member 17 located near from the occupant at the position where the coolant temperature gauge displaying does not overlap with the speed meter displaying 20 and the tachometer displaying 21, the fine visibility is maintained.

Also, if the eyepoint of the occupant P is moved to the left, the fuel gauge displaying 22 is reflected and displayed at the proximity of periphery of right edge of the half-mirror member 17 positioned near from the occupant at the position where the fuel gauge displaying does not overlap with the speed meter displaying 20 and the tachometer displaying 21, thus the fine visibility is maintained.

In the first embodiment, as shown by a two-dot chain line in FIG. 1, the digital speed meter displaying 26 is configured to be displayed at substantially the center of the half-mirror member 17 in the direction of vehicle-width alternatively with the speed meter displaying 20 and the tachometer displaying 21, so as not to be displayed together.

As described in the foregoing, in the. information displaying apparatus for the vehicle described in the first embodiment, if the displaying which is near from the occupant is carried out at the proximity of periphery of left and right edges of the near half-mirror member 17 and at the area where the displaying does not overlap with the images of the far half-mirror member 18 and the mirror member 19, and particularly, if the displaying which is near from the occupant is carried out by using parts outside the left and right edges 18a and 18a of the half-mirror member 18 where images displayed thereto do not overlap with the image displayed far from. the occupant even if the eyepoint of the occupant P is moved on left and right to some extent, there will be virtually no overlapping of the displaying even if number of half-mirror members 17 and 18 is increased, thus the fine visibility is maintained.

As described above, although the information displaying apparatus for the vehicle according to the first embodiment of the present invention has been described with reference to the accompanying drawings, the specific structure of the present invention is not limited by the first embodiment, and modifications of design or the like made without departing from a gist of the present invention are included in the present invention.

For example, the cluster 15a of the information displaying device 15 is fixed onto the upper surface of the instrument panel 2 at the front of the driver seat 13 in the information displaying apparatus for the vehicle according to the first embodiment. However, the information displaying device 15 may be provided at a position on the upper surface and center of the instrument panel 2 between the driver seat 13 and a passenger seat 14 shown by a two-dot chain line in FIG. 2.

In this case, since the fine visibility can be obtained even if the vehicle interior opening 15b of the cluster 15a is not opposed to be in front of the occupant P seated in the driver seat 13, it is also possible to provide other information to some of the occupant seated in the passenger seat 14 by using part of a displaying area, for example, at the proximity of periphery of right edge, of the half-mirror member 17.

Also, shape, numerical quantity and material relating to the cluster 15a described in the first embodiment are not particularly limited thereto.

Furthermore in the information displaying apparatus for the vehicle according to the first embodiment, although a liquid crystal display device provided with the plurality of backlights 16b . . . is used as the panel-display device 16, it is not particularly limited by this. Other electro-optical devices such as a CRT, organic electroluminescence, inorganic electroluminescence, or VFD (Vacuum Fluorescent Display), or other displaying devices structured by semiconductor devices may be employed as the panel-display device, and particularly, when a self-luminous panel-display such as the organic electroluminescence is used, the panel-display device can be made thinner and downsizing is further possible, since the backlights 16b . . . in the first embodiment are not necessary. Thereby, space around the panel-display device can be efficiently used.

Also in the information displaying apparatus for the vehicle according to the first embodiment, although three half-mirror members 17, 18 and 19 constitute the reflecting mirror members which are disposed in parallel, the present invention is not limited to this arrangement. The present invention may be arranged with two, or more than four half-mirror members, and shape, numerical quantity, and material of the half mirror members are not limited in the present invention as long as the members have substantially the same outer shape with the members in the present invention.

Furthermore, although the displaying surface 16a of the panel-display device 16 is fixed to be faced toward upward in the information displaying apparatus for the vehicle according to the first embodiment, the present invention is not limited to this. For example, the displaying surface 16a may be fixed to be faced downward in the cluster 15a, and the half-mirror members 17 and 18 and the like may be provided at downside of the displaying surface.

As described in the foregoing, according to the first embodiment of the information displaying apparatus for the vehicle, the vehicle information display is reflected and displayed on substantially the center of the reflecting mirror member provided far from the occupant, by the displaying control in the displaying surface.

Accordingly, because the amount of movement in the line of sight when the occupant sees the vehicle information display can be set less, the visibility is fine.

Also, because the other vehicle information display is reflected and displayed on the proximity of periphery of the reflecting mirror member provided near to the occupant at the position where the other vehicle information display does not overlap with the vehicle information display, it is possible to display the other vehicle information display, relatively large at the position nearest from the occupant.

At this time, because the other vehicle information display displayed near from the occupant does not overlap with the vehicle information display displayed on the far reflecting mirror member, the fine visibility is maintained even if the plurality of reflecting mirror members is used.

In addition, because the warning display is displayed relatively large at the position where nearest from the occupant in the information displaying apparatus for the vehicle according to the first embodiment, it is possible to call the occupant's attention.

Furthermore, if the direction-indicating displays are configured to be displayed, for example, at the proximity of periphery of left and right edges of the reflecting mirror member located near to the occupant in the information displaying apparatus for the vehicle according to the first embodiment, it is easy to understand intuitively that the displaying thereof are the direction indicator for the left, and the direction indicator for the right.

In the information displaying apparatus for the vehicle according to the first embodiment, when the vehicle approaches to the ETC gate from the distance away from the gate, at first, the ETC approximation-notification display is reflected and displayed on the far reflecting mirror member, and then reflected and displayed on the reflecting mirror member arranged near to the occupant.

Accordingly, because the pictorials for displaying the ETC gate schematically can be seen in the device as if they approach toward the occupant, it is easy to recognize that the ETC gate approaches.

Furthermore in the information displaying apparatus for the vehicle according to the first embodiment, when the vehicle approaches to the ETC gate from the distance away from the gate, at first, the pictorial diagram is displayed relatively small on the reflecting mirror member, and then displayed on the reflecting mirror member larger compared with the displaying of the case in which the gate is away from the vehicle.

Accordingly, because the pictorials for displaying the ETC gate schematically can be seen even in the device as if they approach toward the occupant, it is easy to recognize that the ETC gate approaches.

In the information displaying apparatus according to the first embodiment, when the eyepoint detecting means detects the eyepoint of the occupant, the display position of the vehicle information display or the other vehicle information display is changed to the position easier to see, according to the movement of the eyepoint.

At this time, because the other vehicle information display is reflected and displayed on the proximity of periphery of the reflecting mirror member provided near from the occupant at the position where the other vehicle information display does not overlap with the vehicle information display, the present invention exhibits a practical-beneficial effect that the fine visibility can be maintained even if the number of reflecting mirror members is increased.

Second Embodiment

FIGS. 10-16 show an information displaying apparatus for a vehicle according to a second embodiment of the present invention.

Meanwhile, parts in the present embodiment, which are same or equivalent to the above-mentioned conventional apparatuses, will be explained by attaching same reference numerals used therein.

First of all to explain from a structure, in the information displaying apparatus for the vehicle according to the second embodiment, an instrument panel 2 as a vehicle-body member is provided at front of a driver seat 113 and is extended along a direction of width of the vehicle inside of a vehicle interior 1.

An information displaying device 115 as the information displaying apparatus for the vehicle is mounted on an upper surface of the instrument panel 2 and arranged directly underneath a front window panel 111 with upwardly projecting a cluster 115a as a storage portion formed to be integral with the upper surface of the instrument panel 2, which is as the vehicle-body member.

A panel-display device 116 as a display device is stored with a condition that a displaying surface 116a thereof is laid substantially horizontally and directed upwardly inside of the cluster 115a.

The panel-display device 116 in the second embodiment is provided with a plurality of backlights 116b . . . at a back surface of the panel-display device.

Also, two half-mirror members 117 and 118 for reflecting light partly and having half-permeability, and a mirror member 119, which are as reflecting mirror members, are provided in the cluster 115a located at an upper part of the displaying surface 116a of the panel-display device 116, from a position near to an occupant to a position far from the occupant and arranged in a certain distance from each other.

Among those members, the half-mirror members 117 and 118 each has a rectangular shape which is horizontally long if seen from front, and they are attached to an inner wall of the cluster 115a, respectively, by being arranged in the certain distance from each other, so as to be slanted ($\theta$=45 degrees) along the displaying surface 116a, thereby configured to reflect information on the vehicle displayed in respective areas L1, L2 and L3 of the displaying surface so that the vehicle information which are reflected and displayed on the members can be seen from the occupant.

More specifically, the displaying surface 116a of the panel-display device 116 is connected with a display controlling portion 116c, thereby it is configured that displaying of the vehicle information on the displaying surface 116a is controlled by controlling, for example, a position where the displaying is reflected, and a kinds of displaying such as colors and size thereof, when reflecting and displaying the various vehicle information of the vehicle on the respective half-mirror members 117 and 118 and the mirror member 119.

Figure 16:
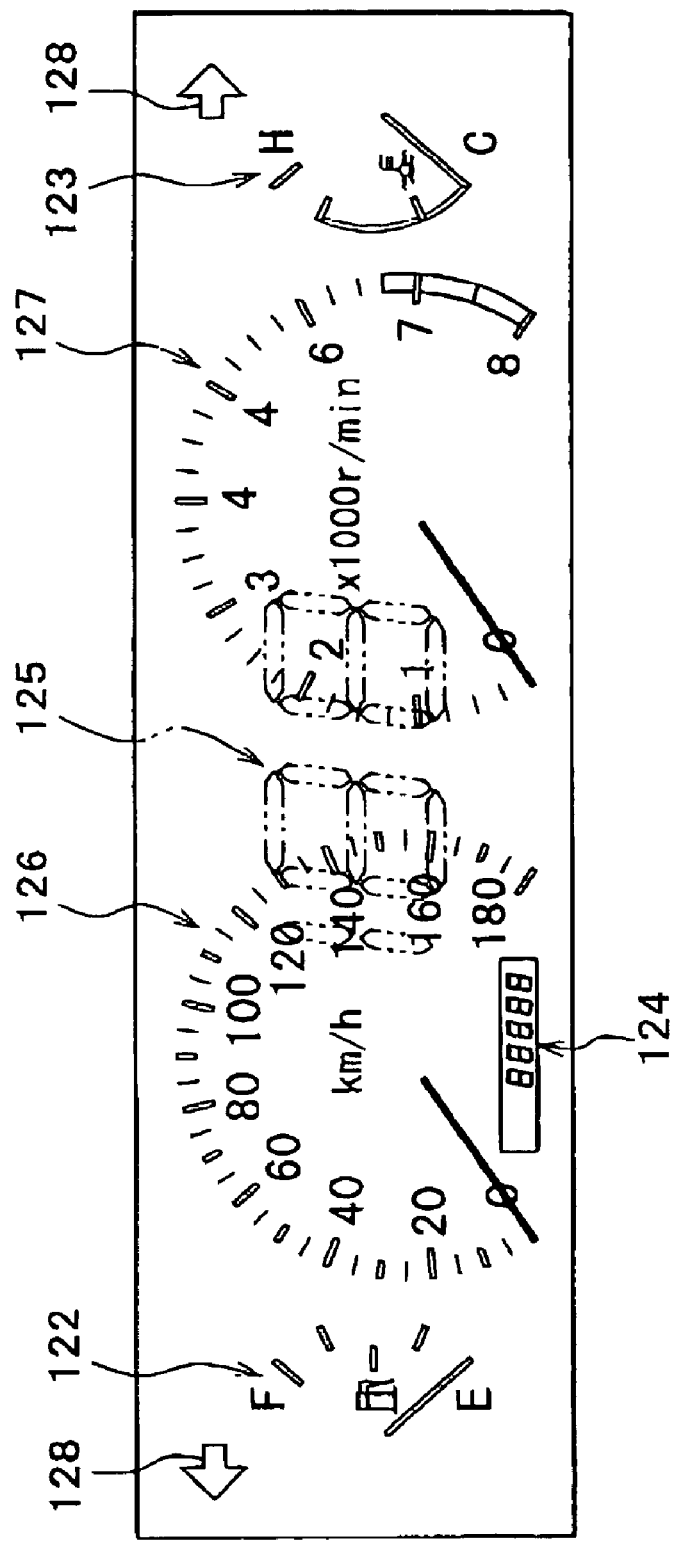
FIG. 16 is a front view showing one example of a display displayed on a vehicle interior opening of a cluster according to the second embodiment.
Figure 17:
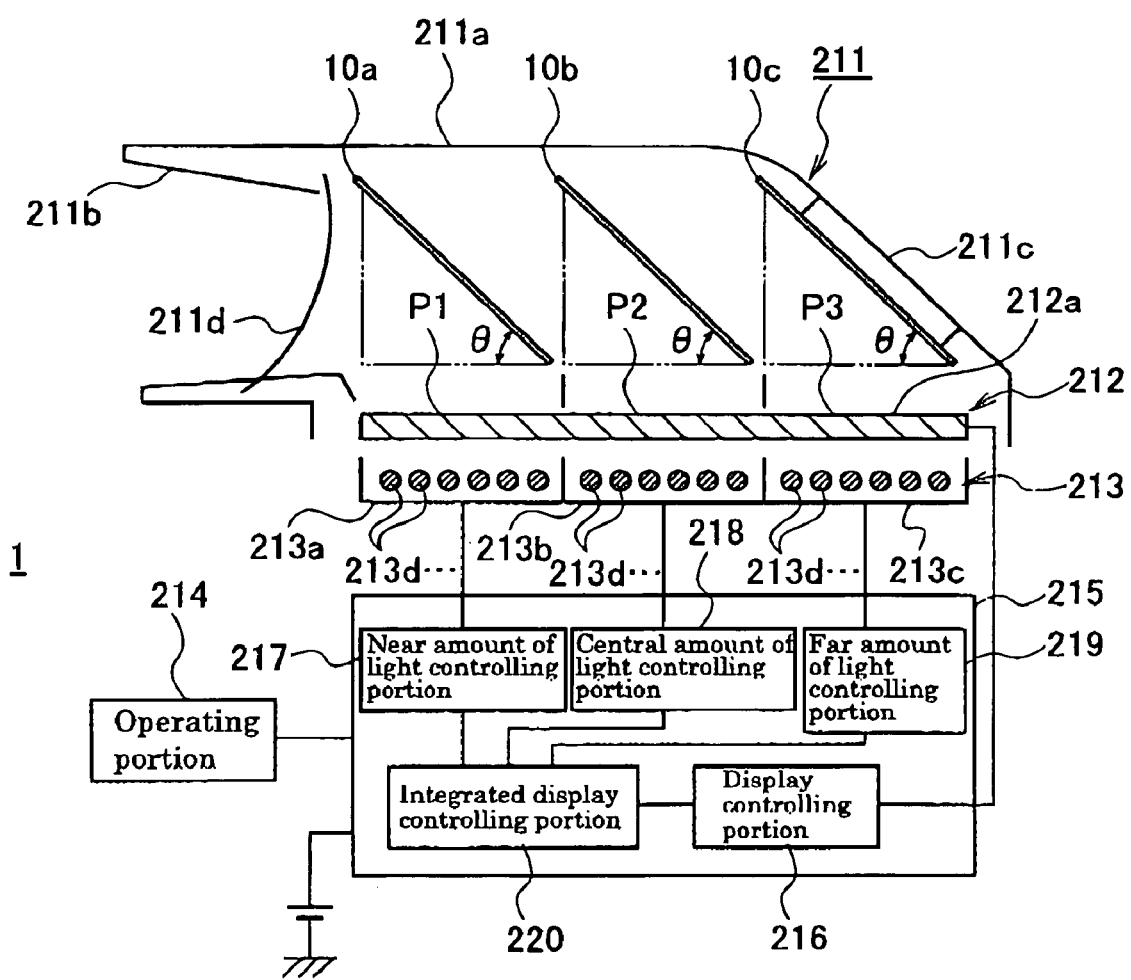
FIG. 17 is a cross-sectional view showing an information displaying apparatus for a vehicle according to a third embodiment of the present invention, taken along A-A line in FIG. 18.

In the second embodiment, if the display controlling portion 116c controls the area L2 of the displaying surface 116a to perform a predetermined displaying, as shown in FIG. 16, displaying of a speed meter 126 and displaying of a tachometer 127 as a vehicle information display are reflected and displayed at substantially center and in the vehicle-width direction of the half-mirror member 118 provided far or center from occupant, so that they become as erected images if seen from the occupant.

In addition, if the display controlling portion carries out a control such that predetermined displaying is displayed in the area L2 of the displaying surface, and direction-indicating displays 128 and 128 are reflected and displayed at proximity of periphery of left and right edges of the half-mirror member 117 located near to the occupant at positions where the direction-indicating displays do not overlap with the speed meter displaying 126 and the tachometer displaying 127 (see FIG. 16).

Attached to a vehicle interior-opening 115b of the cluster 115a is a front cover member 115c made of a transparent member which is formed to be incurved in a concaved shape so that a reflection from the vehicle interior is prevented.

In the second embodiment, an opening for projection 115d which opens from the upper surface of the cluster to front of the vehicle is formed on the cluster 115a.

At a front end edge of the opening for projection 115d, a rotational lid member 120 is provided which is arranged to be capable of opening and closing approximately half of a front area of the opening for projection 115d by a rotational operation which shaft portions 121 and 121 are center of the rotation thereof.

Figure 13:
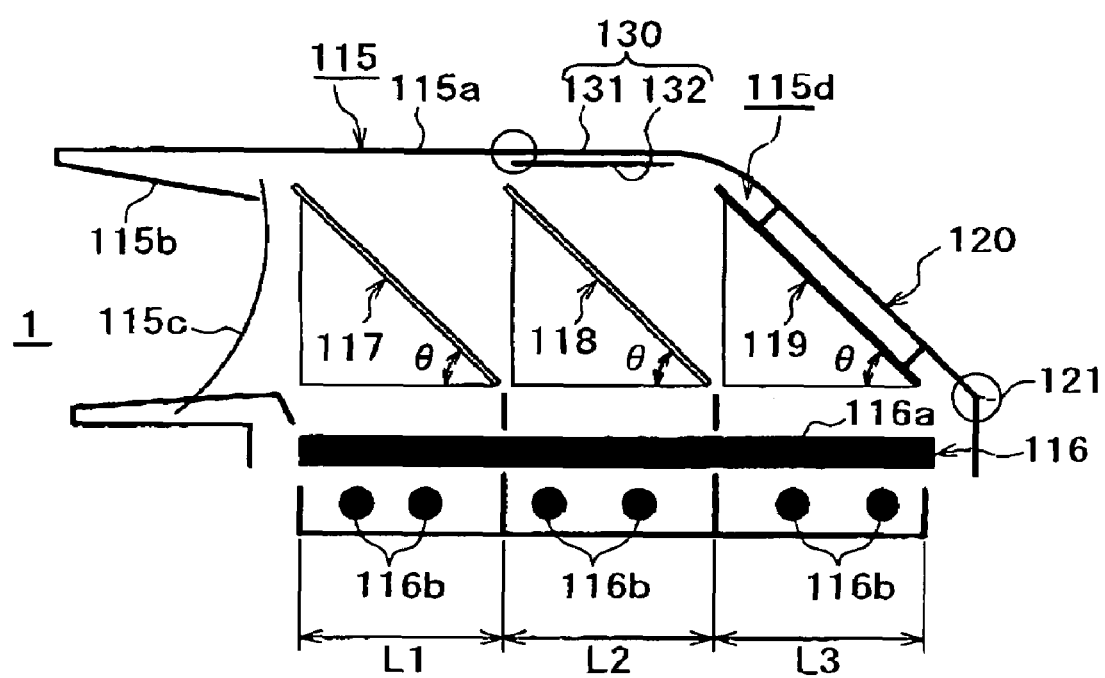
FIG. 13 is a cross-sectional view taken along B-B line in FIG. 11 according to the second embodiment.

As shown in FIG. 13, the half-mirror member 119 located far from the occupant is provided at a back surface of the rotational lid member 120 arranged in the certain distance from the half-mirror member 118 in such a manner as to be slanted ($\theta$=45 degrees) in a state when the rotational lid member 120 closes approximately half of the front area of the opening for projection 115d.

Figure 10:
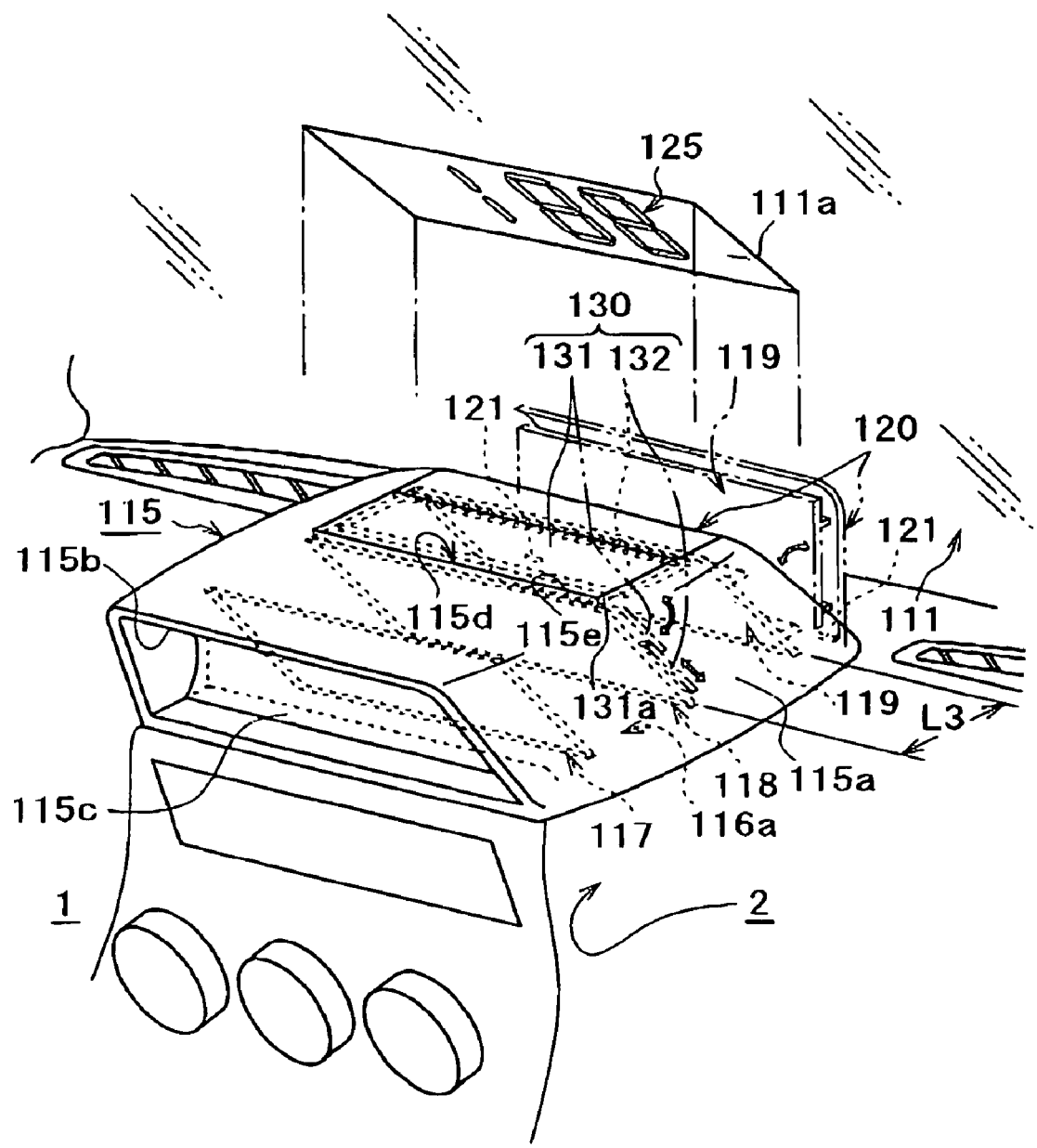
FIG. 10 is a perspective view showing an information displaying apparatus for a vehicle according to a second embodiment of the present invention and also showing a structure of a center-upper part of an instrument panel in a direction of width of the vehicle.
Figure 15:
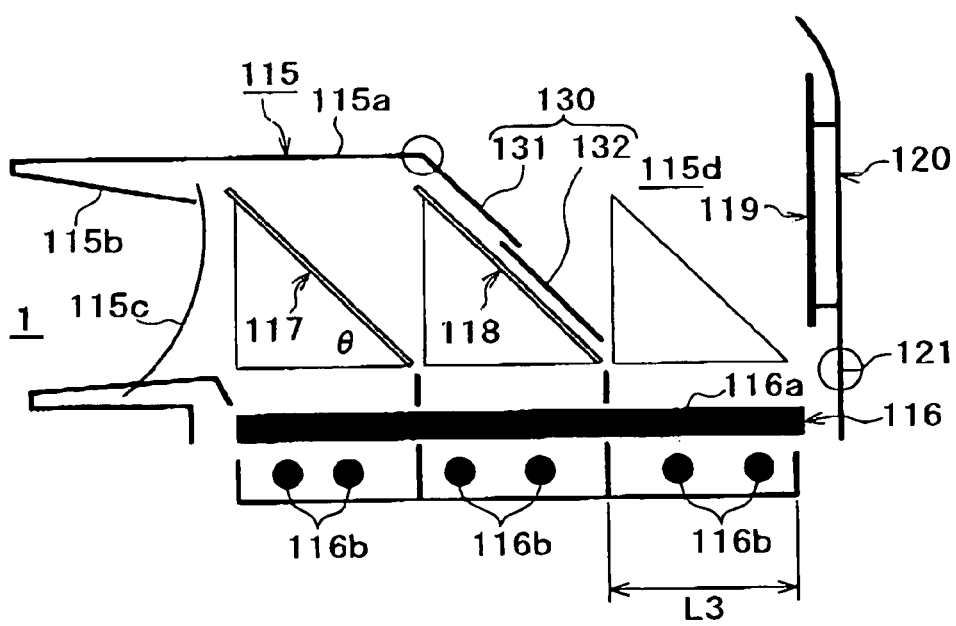
FIG. 15 is a cross-sectional view equivalent to the position taken along the B-B line in FIG. 11, explaining a state that a mirror member is erected by opening the rotational lid member according to the second embodiment.

In addition, the mirror member 119 is configured to be erected substantially perpendicularly in a state when the opening for projection 115d is opened utmost as shown with a two-dot chain line in FIG. 10, or a state shown in FIG. 15. In an erected state of the mirror member, it is configured that the vehicle information display displayed in the area L3 of the displaying surface 116a is projected directly on a projected portion 111a of the front window panel 111.

More specifically, in the state that the rotational lid member 120 is closed, if the display controlling portion 116c carries out predetermined displaying in the area L3 of the displaying surface 116a, displaying of a fuel gauge 122 and displaying of a coolant temperature gauge 123 are reflected and displayed respectively at proximity of periphery of left and right edges of the mirror member 119 provided farthest from the occupant, as shown in FIG. 16.

Additionally, displaying of an odd/trip meter 124 is reflected and displayed at proximity of a lower edge of the mirror member 119, thereby the displaying thereof are configured to be as the erected image if seen from the occupant.

In the state that the rotational lid member 120 is opened to be erected, displaying of digital speed meter 125 which is to be projected on the projected portion 111a of the front window panel 111 is configured to be displayed in the area L3 so as to be in the erected image if seen from the occupant, by changing over displaying in the area L3 or without changing the displaying therein.

Furthermore in the second embodiment, in the state that the rotational lid member 120 is opened to be erected, the fuel gauge displaying 122 and the coolant temperature gauge displaying 123 are configured to be displayed in the area L1 of the displaying surface 116a by changed over from the area L3, so that they are changed over and reflected to be displayed on the half-mirror member 117 arranged nearest to the occupant.

Figure 12:
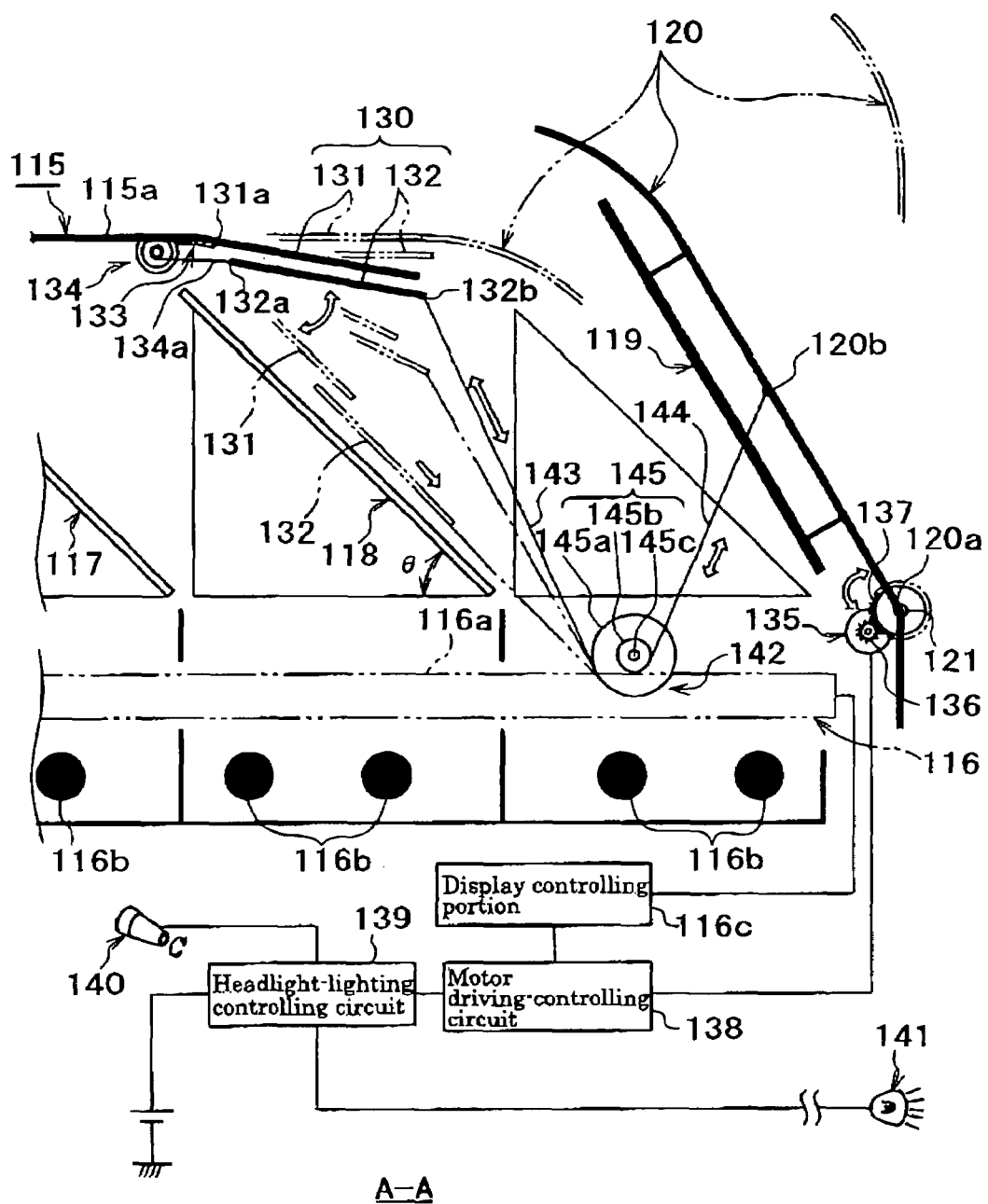
FIG. 12 is an enlarged cross-sectional view of a main part taken along A-A line in FIG. 11 according to the second embodiment.

Also, at an end edge 115e which is rearward of the vehicle of the opening for projection 115d, a slide lid member 130 as a cover member shown in FIG. 12 for opening and closing substantially rear half of the opening for projection 115d is provided.

The slide lid member 130 is biased to be substantially horizontally to the vehicle rearward-end edge 115e, and has a first top panel member 131 which a rear end edge 131a thereof is attached in such a manner that the rear end edge becomes rotatable by a hinge member with a spring 133.

Also, the slide lid member 130 is mainly structured by having a second top panel member 132 provided at a back surface of the first top panel member 131 and capable of moving slidingly in forward and backward directions of the vehicle along a slide rail formed on the first top panel member 131.

A rear end edge 132a of the second top panel member 132 is connected with an end of a wire 134a extended from a winding device 134 provided at a back surface of the upper surface of the cluster 115a, thereby a constant tensile force toward rearward of the vehicle is given to the second top panel member, constantly. The first top panel member 131 and the second top panel member 132 of the slide lid member 130 are, as shown in FIG. 15, configured to be rotated toward a lower part by rotating around the hinge member with the spring 133 as a center with a condition which the second top panel member 132 is completely drawn out from the back surface of the first top panel member 131. Thereby, substantially entire surface of the half mirror member 118 is configured to be covered along a back surface of the half-mirror member 118 arranged nearer than the mirror member 119 from the occupant.

In the second embodiment, a driving motor 135 as driving means for allowing the rotational lid member 120 to carry out the rotating operation is provided at proximity of the shaft portions 121.

The driving motor 135 is connected to a motor driving-controlling circuit 138, and by engaging a pinion gear 136 fixed to a motor shaft of the driving motor with a speed-reduction gear 137 formed integrally with an end edge 120a of the rotational lid member 120, it is configured that a rotating force of the motor shaft is converted to a rotating force having a torque necessary to be used for the rotating of the rotational lid member 120.

Also, the motor driving-controlling circuit 138 for the driving motor 135 is connected with the display controlling portion 116c, thereby the control of the displaying carried out in the display controlling portion 116c is configured to be changed depending on opening and closing positions of the rotational lid member 120.

In the second embodiment, the motor driving-controlling circuit 138 of the driving motor 135 is connected with a headlight lighting-controlling circuit 139 as headlight lighting means.

When a headlight switch 140 provided at proximity of the driver seat 113 is operated to be in "ON" state to light the headlight 141, it is configured that the driving motor 135 is driven and rotated to open the rotational lid member 120 to allow the rotational lid member to be in the erected state. If the headlight switch 140 is operated to be in an "OFF" state to turn off the headlight 141, it is configured that the driving motor 135 is driven and rotated in a reverse direction to close the rotational lid member 120.

Furthermore in the second embodiment, an interlocking mechanism 142 to interlock the erecting operation of the mirror member 119 provided far from the occupant with the covering operation of the slide lid member 130.

The interlocking mechanism 142 is structured mainly by an interlocking pulley member 145 which is mounted to both left and right sides of the panel-display device 116 so as to be rotatable, and which integrates, by an interconnecting shaft 145c, a large pulley member 145a for winding a wire for drawing out 143 connected to a front end edge 132b of the second top panel member 132 and a small pulley member 145b for winding a wire 144 connected to a substantially center part 120b which is in a longitudinal direction of the rotational lid member 120.

Next, an operation of the second embodiment will be explained.

In the second embodiment, as shown in FIG. 13, since the rotational lid member 120 and the slide lid member 130 close the opening for projection 115d of the cluster 115a in the state which the headlight 141 is turned off such as in a normal daytime, there will be no outside light that penetrates inside of the cluster 115a.

Accordingly, the vehicle information displayed in each of the areas L1, L2 and L3 on the displaying surface 116a of the panel-display device 116 by the display controlling portion 116c are reflected and displayed on the respective half-mirror members 117 and 118 and the mirror member 119, thereby the vehicle information are seen and recognized by the occupant through the vehicle interior-opening 115b of the cluster 115a with a high contrast as shown by a solid line in FIG. 16.

Next, if the headlight switch 140 located at the proximity of the driver seat 113 is operated to be in the state of "ON" when driving in a nighttime or the like, the headlight-lighting controlling circuit 139 operates the headlight 141 to be lighted, and at the same time, a lighting signal is outputted to the motor driving-controlling circuit 138 connected to the headlight-lighting controlling circuit, thus the motor driving-controlling circuit 138 drives and rotates the motor shaft of the driving motor 135.

Figure 14:
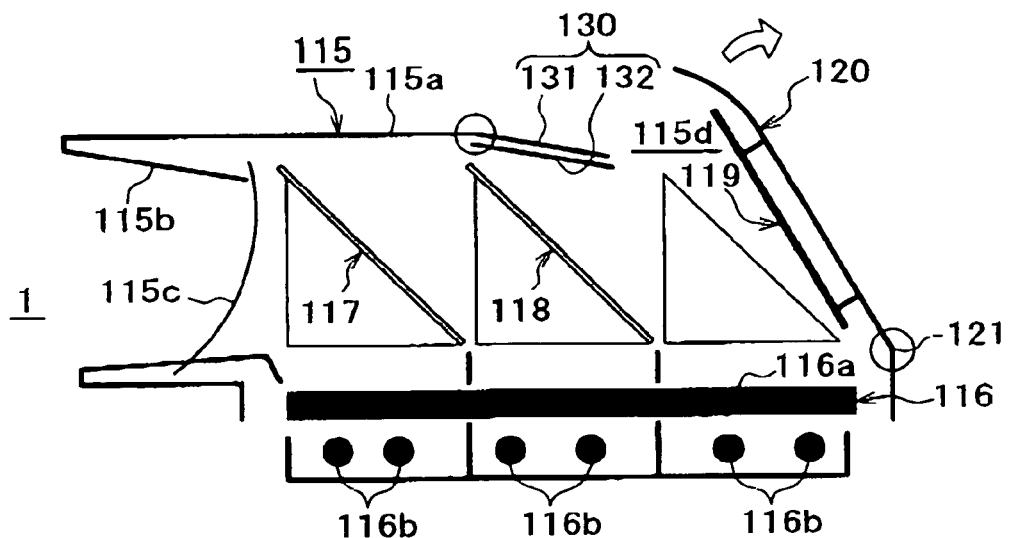
FIG. 14 is a cross-sectional view equivalent to a position taken along the B-B line in FIG. 11, explaining a state in which a rotational lid member is rotated according to the second embodiment.

By the rotation of the pinion gear 136 fixed to the motor shaft of the driving motor 135, the speed-reduction gear 137 being engaged with the pinion gear rotates the rotational lid member 120 toward a direction of front of the vehicle as shown by an arrow in FIG. 14, by rotating around the shaft portions 121 as the center of rotation.

As shown in FIG. 15, when the mirror member 119 which is provided far from the occupant is erected together with the rotational lid member 120, within the vehicle information display displayed on the displaying surface 116a, the vehicle information display displayed in the area L3 which is an area corresponding to the mirror member 119 is projected on the front window panel 111.

In the second embodiment, in addition to the fuel gauge displaying 122 and the coolant temperature gauge displaying 123 as the vehicle information display which are to be displayed by the display controlling portion 116a in the area L3 by being operated simultaneously with the erection of the mirror member 119, or as a substitute for the fuel gauge displaying and the coolant temperature gauge displaying, the digital speed meter displaying 125 is displayed.

At this time, by displaying the fuel gauge displaying 122 and the coolant temperature gauge displaying 123 and so on in the area L1 by the display controlling portion 116c and reflecting and displaying them on the half-mirror member 117, it is also possible to display the fuel gauge displaying 122 and the coolant temperature gauge displaying 123 and so on at a position where an occupant can see them as substantially the same position where the fuel gauge displaying and the coolant temperature gauge displaying and so on arc displayed when they are displayed in the area L3 and reflected to be displayed on the mirror member 119, as shown in FIG. 16. Accordingly, there will be no reduction in an amount of vehicle information.

As described above, as shown in FIG. 10, since the vehicle information display such as the digital speed meter displaying 125 can be set to be displayed at the position of the front window panel 111 where visible with a line of sight having an angle near to a line of sight to see the front of the vehicle, it is possible to reduce an amount of movement in the line of sight of the occupant.

Also, in the interlocking mechanism 142, by the erecting operation of the rotational lid member 120, the wire 144 is pulled toward an upper part, slantwise, and thereby the small pulley member 145b of the interlocking pulley member 145, which is winded, is rotated.

By the rotation of the interlocking pulley member 145, the large pulley member 145a winds the wire for drawing out 143, thus the rear end edge 132a of the second top panel member 132 of the slide lid member 130 is pulled down toward the lower part, slantwise.

In the slide lid member 130, the first top panel member 131 is rotated toward the lower part against a biasing force of the hinge member with the spring 133, and then, as shown by a two-dot chain line in FIG. 12, the second top panel member 132 is slid to be drawn out from the back surface of the first top panel member 131 against the tensile force of the wire 134a of the winding device 134.

Therefore, as shown in FIG. 15, since the first top panel member 131 and the second top panel member 132 of the slide lid member 130 are deployed along the back surface of the half-mirror member 118 which is provided nearer than the mirror member 119 and cover substantially entire surface of the half-mirror member, there is no possibility of the outside light penetrating from the back surface of the half-mirror member 118 into the cluster.

Accordingly, the vehicle information of the displaying surface 116a displayed in the area L2 which is the area corresponding to the half-mirror member 118 is reflected toward the occupant by the half-mirror member 118, thereby the vehicle information is seen and recognized by the occupant with a fine contrast.

Therefore, the digital speed meter displaying 125 projected on the front window panel 111 is displayed in the vehicle interior, and at the same time, the speed meter displaying 126 and the tachometer displaying 127 and the like represented by a solid-line in FIG. 16 are displayed in the vehicle interior-opening 115b of the cluster 115a, simultaneously, and are seen and recognized.

Thereby, an effective display area, where visible, is increased more than an effective display area where only within the vehicle interior-opening 115b.

In addition, since the speed meter displaying 126 and the tachometer displaying 127 and the like can be displayed without overlapping them with the digital speed meter displaying as shown by the solid line in FIG. 16, as compared with a case that the digital speed meter displaying 125 is displayed to be overlapped with the speed meter displaying and the tachometer displaying by using only inside of the vehicle interior-opening 115b as shown with a two-dot chain line in FIG. 16, the visibility is fine furthermore.

Also, since the erecting operation of the mirror member 119 and the covering operation of the slide lid member 130 are interlocked by the interlocking mechanism 142, the erecting operation and the covering operation can be carried out simultaneously by the one driving motor 135.

Furthermore in the second embodiment, since the mirror member 119 is provided at the back surface of the rotational lid member 120, it is possible to erect the mirror member 119 simultaneously with the rotation or the rotational lid member 120, without a necessity of providing a special connecting mechanism between the mirror member 119 and the rotational lid member 120.

Accordingly, by suppressing an increment in number of parts by means of simplifying the structure, it is possible to suppress a rise in a production cost.

In the second embodiment, when the lighting operation of the headlight 141 is carried out by the headlight-lighting controlling circuit 139, the mirror member 119 is erected by the driving motor 135, and thereby the digital speed meter displaying 125 displayed on the displaying surface 116a is projected on the projected portion 111a of the front window panel 111.

Accordingly, since the vehicle information can be projected to be displayed on the position at the front window panel 111 where the movement in the line of sight is less and easy to see without a necessity of providing other switches or the like for performing the erecting operation and to carry out an "ON" operation of those switches or the like during the nighttime, convenience of using the second embodiment is fine.

If the headlight switch 140 located at the proximity of the driver seat 113 is operated to be in the state of "OFF" to turn off the lighting of the headlight 141, the headlight-lighting controlling circuit 139 operates the headlight 141 to be off, and at the same time, a lighting off-signal is outputted to the motor driving-controlling circuit 138 connected to the headlight-lighting controlling circuit, thus the motor driving-controlling circuit 138 reversely drives and rotates the motor shaft of the driving motor 135.

Accordingly, the rotational lid member 120 is rotated toward the rear of the vehicle by rotating around the shaft portions 121 as the center of the rotation, and thus the opening for projection 115d is closed as shown in FIG. 13.

Also, the second top panel member 132 is slidingly moved to and received at the back surface of the first top panel member 131 by the wire 134a being winded by the winding device 134, and at the same time, the first top panel member 131 returns to a position where substantially horizontal by the biasing force of the hinge member with the spring 133, thereby the opening for projection 115d is closed.

In the second embodiment, displaying of the vehicle information display which is to be displayed in the area L3 is returned to the fuel gauge displaying 122 and the coolant temperature gauge displaying 123 by the display controlling portion 116a, in conjunction with the closing of the rotational lid member 120 provided to the mirror member 119.

As described above, the information displaying apparatus for the vehicle according to the second embodiment of the present invention has been described with reference to the accompanying drawings. However, the specific structure of the present invention is not limited to the second embodiment, and modifications of design or the like made without departing from a gist of the present invention are included in the present invention.

Figure 11:
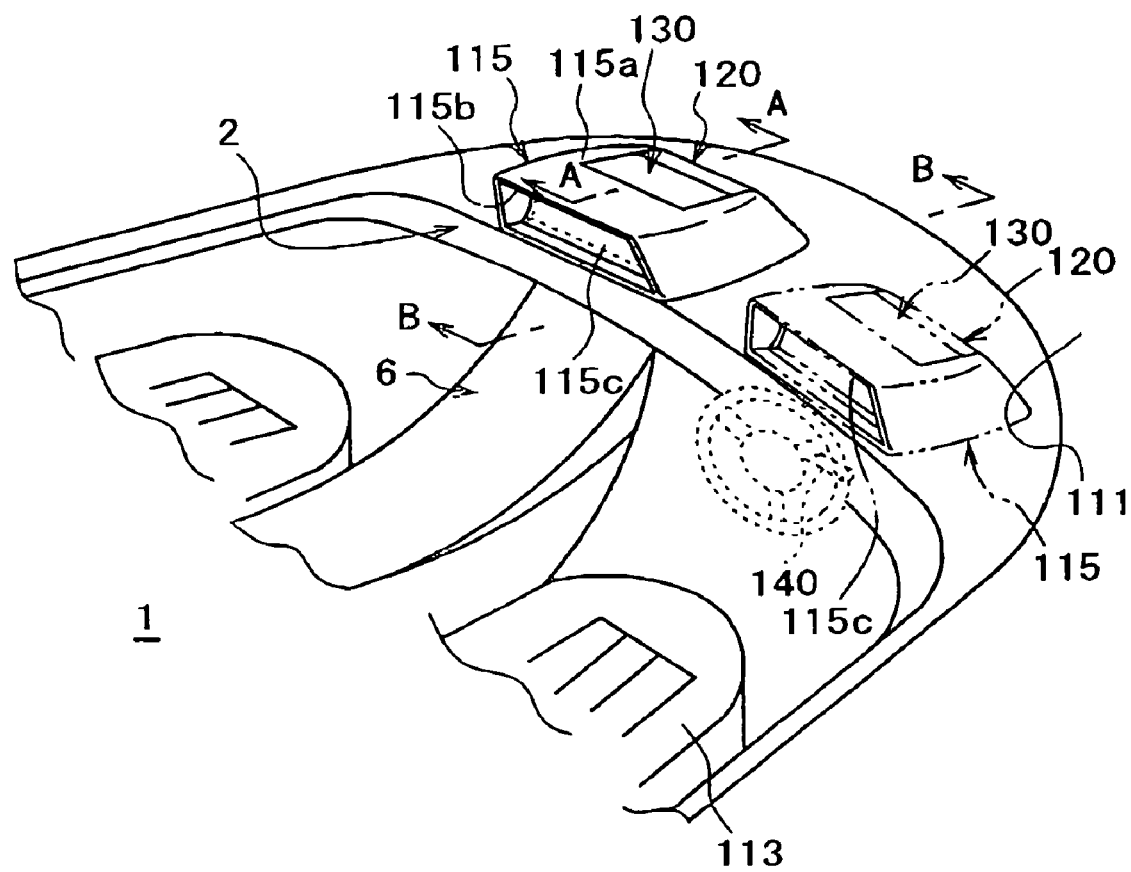
FIG. 11 is a schematic perspective view explaining a structure of the vehicle interior according to the second embodiment.

For example, although the cluster 115a of the information displaying device 115 is fixed onto the upper surface of the instrument panel 2 in the direction of the vehicle-width according to the second embodiment, the information displaying device 115 may be provided on the upper surface of the instrument panel 2 and in front of the driver seat 113 as shown by a two-dot chain line in FIG. 11.

Also, the information displaying device 115 of the second embodiment is not particularly limited by shape, numerical quantity and material relating to the cluster 115a.

Furthermore in the information displaying device 115 according to the second embodiment, although a liquid crystal display device provided with the plurality of backlights 116b is used as the panel-display device 116, it is not particularly limited by this. Other electro-optical devices such as a CRT, organic electroluminescence or inorganic electroluminescence, or other displaying devices structured by semiconductor devices may be employed as the panel-display device. Particularly, when a self-luminous panel-display such as the organic electroluminescence is used, the panel-display device can be made thinner and downsizing is further possible, since the backlights 116b . . . in the second embodiment are not necessary. Thereby, space around the panel-display device can be efficiently used.

Also in the second embodiment, although two half-mirror members 117 and 118, and the mirror member 119 constitute the reflecting mirror members, the present invention is not limited to this arrangement. One, or more than three half-mirror members may be combined to be arranged with the mirror member 119. In addition, shape, numerical quantity, and material of the half mirror members and the mirror member are not limited in the present invention.

Furthermore, in the second embodiment, although it has been explained that the driving motor 135 and the speed-reduction gear 137 are used as the driving means for carrying out the electing operation of the mirror member 119, the present invention is not limited by this. For example, the mirror member 119 may be erected by a solenoid, or the rotational lid member 120 may be rotated manually, thus the driving means is not particularly limited by the one which uses the driving motor and the speed-reduction gear.

Also, in the second embodiment, although the erecting operation of the far mirror member 119 and the covering operation of the slide lid member 130 are interlocked by the interlocking mechanism 142, the interlocking mechanism may be structured by, for example, a link mechanism, a cam mechanism or a chain mechanism, and not particularly limited by the interlocking mechanism 142.

As described in the foregoing, when the reflecting mirror member provided far from the occupant is erected, within the vehicle information display displayed on the displaying surface, the vehicle information display displayed in the area corresponding to the mirror member provided far from the occupant is projected on the front window panel.

Therefore, because the vehicle information display can be set to be displayed at the position of the front window panel where visible with the line of sight having the angle near to the line of sight to see the front of the vehicle, it is possible to reduce the amount of movement in the line of sight of the occupant.

In addition, because the cover member covers the reflecting mirror member along the back surface of the near reflecting mirror member, there is no possibility of the outside light penetrating from the back surface of the reflecting mirror member into the cluster.

Accordingly, the vehicle information of the displaying surface displayed on the area corresponding to the near reflecting mirror member is seen and recognized by being reflected toward the occupant by the reflecting mirror member.

Therefore, because the effective display area, where visible, is increased by projecting the vehicle information display on the front window panel, the visibility of the vehicle information display is furthermore fine.

Also, in the information displaying device according to the second embodiment, because the erecting operation of the far reflecting mirror member and the covering operation of the cover member are interlocked by the interlocking mechanism, it is possible to carry out the erecting operation and the covering operation by at least one driving means.

Therefore, the increment in the number of parts can be Suppressed, and the rise in the production cost can also be suppressed.

In the information displaying device according to the second embodiment, when the lighting operation of the headlight is carried out by the headlight lighting means, the driving means erects the reflecting mirror member, and thereby the vehicle information display displayed on the displaying surface is projected on the front window panel.

Therefore, the present invention exhibits a practical-beneficial effect that the vehicle information can be projected to be displayed on the position at the front window panel where the movement in the line of sight is less and easy to see, without the necessity of providing other switches or the like for performing the erecting operation and to carry out the "ON" operation of those switches or the like during the night-time.

Third Embodiment

FIGS. 17-26 show an information displaying apparatus for a vehicle 211 according to a third embodiment of the present invention.

Meanwhile, parts in the present embodiment, which are same or equivalent to the above-mentioned conventional apparatuses, will be explained by attaching same reference numerals used therein.

Figure 18:
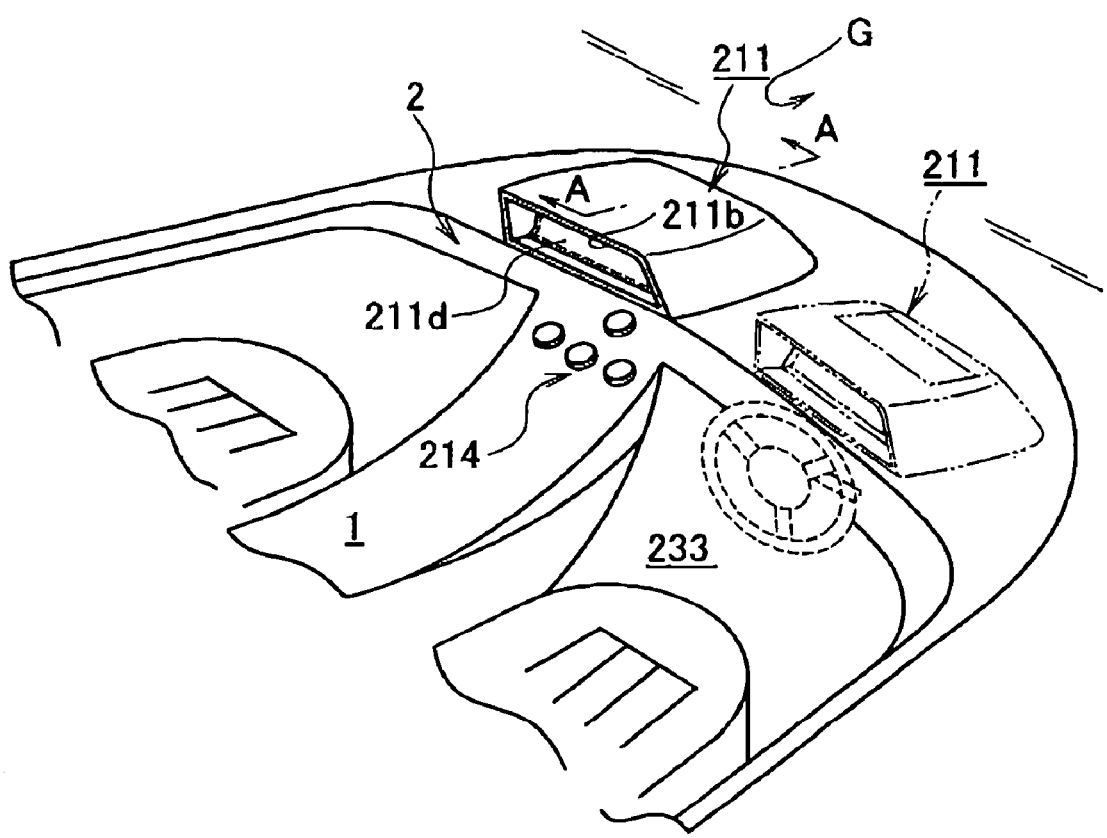
FIG. 18 is a schematic perspective view explaining a structure of the vehicle interior according to the third embodiment.
Figure 19:
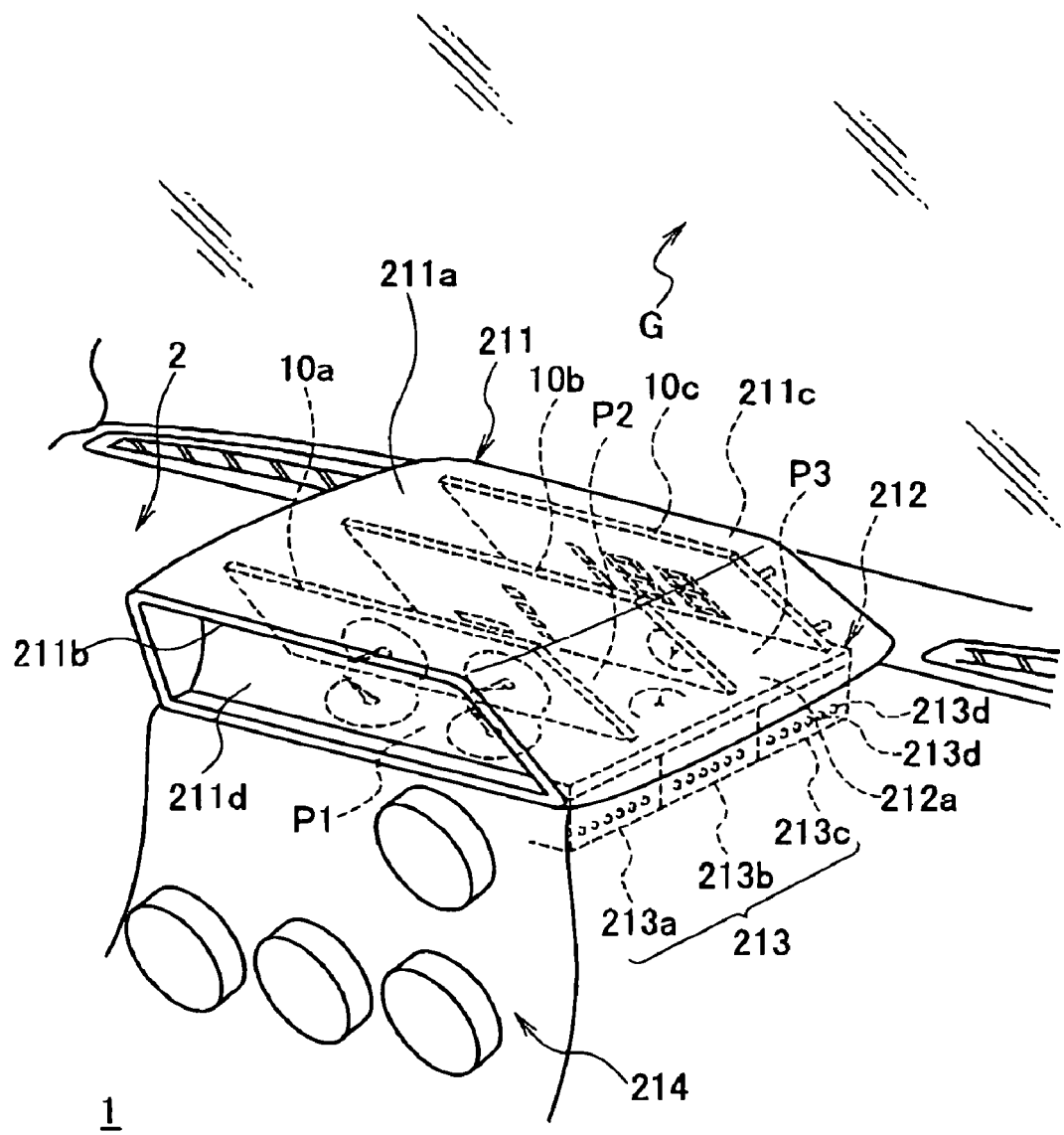
FIG. 19 is a partly-transparent enlarged perspective view explaining a structure of a main part according to the third embodiment.

First of all, to explain from a structure, in the information displaying apparatus for the vehicle 211 according to the third embodiment, an instrument panel 2 as a vehicle-body member is provided at front of a driver seat 233 and is extended along a direction of width of the vehicle inside of a vehicle interior 1, as shown in FIGS. 18 and 19.

The information displaying apparatus for the vehicle 211 is provided on an upper surface of the instrument panel 2 located at a center portion in the direction of vehicle-width of the instrument panel and at directly underneath a front window panel G arranged at front of the vehicle interior 1, to be integral with the upper surface of the instrument panel 2.

The information displaying apparatus for the vehicle 211 is mainly provided with a hollow cluster 211a as a storage portion which is provided to be projected upwardly.

The cluster 211a is mainly structured by an opening 211b which is formed to be opened toward rearward of the vehicle and to which a cover-glass member 211d is fitted. At a proximity of bottom surface inside of the cluster 211a, a panel-display device 212 as a display device is stored with a condition which a displaying surface 212a thereof is laid substantially horizontally and directed upwardly.

In the information displaying apparatus for the vehicle 211 of the third embodiment, the displaying surface 212a of the panel-display device 212 is divided into three areas, which are areas P1, P2 and P3, in frontward and rearward directions of the vehicle, and at the same time, reflecting mirror members 10a and 10b, and reflecting mirror member 10c are provided along each of the areas P1, P2 and P3 of the displaying surface 212a and also provided to stand slantwise by a certain angle θ (θ=45° in the present embodiment).

Among those members, left and right end edges of the reflecting mirror members 10a and 10b are attached to an inner wall of the cluster 211a and are disposed by having a certain distance from each other to be arranged in parallel.

In addition, these reflecting mirror members 10a and 10b are positioned near to an occupant and center from the occupant within three respective mirror members 10a-10c. In addition, the reflecting mirror members 10a and 10b each has a rectangular-flat plate shape extended in a longitudinal direction and in the vehicle-width direction, structured by half-mirror members having half-translucency and reflecting light partly.

The reflecting mirror member 10c is positioned far from the occupant, and is attached slantwise to an inner surface of a front wall 211c of the cluster 211a by a certain angel θ (θ=45° in the present embodiment), thereby configured to totally reflect displaying of information on the vehicle displayed on the displaying surface 212a.

In addition, the displaying of the vehicle information displayed on the displaying surface 212a is reflected toward the rearward of the vehicle by each of the reflecting mirror members 10a and 10b, and the reflecting mirror member 10c. More specifically, displaying reflected by the reflecting mirror member 10c positioned farthest from the occupant transmits the reflecting mirror members 10b and 10a arranged nearer to the occupant than the reflecting mirror member 10c, and becomes displaying which a luminance thereof is faded at a predetermined amount when transmitting through the reflecting mirror members 10b and 10a. Thereby, it is configured that the displaying on the displaying surface becomes visible by the occupant in the vehicle-interior 1 from the vehicle-interior through the cover-glass member 211d of the opening 211b formed to be opened at a rear-surface of the cluster 211a.

Displaying which is reflected by the reflecting mirror member 10b positioned farther than the reflecting mirror member 10a which is positioned near to the occupant, transmits the reflecting mirror member 10a arranged near to the occupant, and becomes displaying which a luminance thereof is faded at a predetermined amount when transmitting through the reflecting mirror member 10a. Thereby, it is configured that the displaying on the displaying surface becomes visible by the occupant in the vehicle-interior 1 from the vehicle-interior through the cover-glass member 211d of the opening 211b formed to be opened at the rear-surface of the cluster 211a.

Moreover, displaying on the displaying surface 212a reflected toward the rearward of the vehicle by the nearest reflecting mirror member 10a is configured to be visible by the occupant in the vehicle-interior 1 through the cover-glass member 211d of the opening 211b formed to be opened at the rear-surface of the cluster 211a.

In addition, a cold-cathode tube lighting device 213 as a backlight-light source is provided at a back surface of the panel-display device 212.

The cold-cathode tube lighting device 213 is separated into a near backlight portion 213a, a central backlight portion 213b, and a far backlight portion 213c, which are substantially in a box-like shape which an upper surface, having substantially rectangular shape if seen from top, is opened, corresponding to each of the reflecting mirror members 10a, 10b and 10c.

A plurality of cold-cathode tubes (CFL) 213d . . . are arranged in parallel by having a predetermined distance from each other in the near backlight portion 213a, the central backlight portion 213b, and the far backlight portion 213c, respectively, so as to illuminate substantially in sheet-shape. Thus, it is set so as to be capable of changing an amount of light in lighting of the respective backlight portions, by an amount of power-distribution applied thereto.

Next, a structure of a control circuit for carrying out a control in the information-displaying on the displaying surface 212a of the panel-display device 212 and a control in the lighting of the respective near backlight portion 213a, the central backlight portion 213b, and the far backlight portion 211c of the cold-cathode tube lighting device 213 will be explained.

In the third embodiment, an operating portion 214 such as a dial-switch provided on the instrument panel 2 is connected to a controlling unit 215 for carrying out the control in the information-displaying on the displaying surface 212a and the control in the lighting of the respective near backlight portion 213a, the central backlight portion 213b, and the far backlight portion 213c.

The controlling unit 215 is provided with a display controlling portion 216 for carrying out the control in the information-displaying of the displaying surface 212a, and a near amount of light controlling portion 217, a central amount of light controlling portion 218 and a far amount of light controlling portion 219 for respectively carrying out the control in the lighting of the respective backlight portions 213a-213c, and an integrated display controlling portion 220 for controlling the display controlling portion 216, the near amount of light controlling portion 217, the central amount of light controlling portion 218 and the far amount of light controlling portion 219, cooperatively.

Among the controlling portions, the near amount of light controlling portion 217 is connected to the near backlight portion 213a of the cold-cathode tube lighting device 213, and it is configured to be capable of changing the amount of light in the lighting of the near backlight portion by changing a driving current applied to the near backlight portion 213a.

In addition, the central amount of light controlling portion 218 is connected to the central backlight portion 213b of the cold-cathode tube lighting device 213, and it is configured to be capable of changing the amount of light in the lighting of the central backlight portion by changing a driving current applied to the central backlight portion 213b.

In the third embodiment, normally, the amount of light in the lighting or the central backlight portion 213b is set to be relatively bright so that the luminance, which fades when transmitting through the reflecting mirror member 10a located near to the occupant, of the displaying which is displayed on the displaying surface 212a and reflected to the reflecting mirror member 10b located far from the occupant, is compensated by increasing the amount of light in the lighting of the central backlight portion 213b more than the amount of light in the lighting of an area of the near backlight portion 213a.

Furthermore, the far amount of light controlling portion 219 is connected to the far backlight portion 213c of the cold-cathode tube lighting device 213, and it is configured to be capable of changing the amount of light in the lighting of the far backlight portion by changing a driving current applied to the far backlight portion 213c.

In the third embodiment, normally, the amount of light in the lighting of the far backlight portion 213c is set to be furthermore relatively bright so that the luminance, which fades when transmitting through the reflecting mirror members 10a and 10b located near to the occupant, of the displaying which is displayed on the displaying surface 212a and reflected to the reflecting mirror member 10c located farthest from the occupant, is compensated by increasing the amount of light in the lighting of the far backlight portion 213c more than the amount of light in the lighting of areas of the near backlight portion 213a and the central backlight portion 213b.

Also in the third embodiment, within the cold-cathode tube lighting device 213, it is configured to be capable of changing an amount of light in lighting of an area where corresponds to the reflecting mirror member 10c, on which vehicle information displayed in the area P3 of the displaying surface 212a and to be emphasized is reflected and displayed, so as to be increased more than an amount of light in lighting of areas where correspond to other reflecting mirror members 10a and 10b.

Furthermore in the third embodiment, the control in the near amount of light controlling portion 217, the central amount of light controlling portion 218, the far amount of light controlling portion 219, and the display controlling portion 216 are configured to be cooperatively controlled by the integrated display controlling portion 220 so that a display-luminance in the displaying displayed on the displaying surface 212a of the display device 212 is changed in accordance with the change in the amount of light in the lighting of the cold-cathode tube lighting device 213.

More specifically in the third embodiment, in cooperation with the control in increasing and decreasing of the amount of light in the near backlight portion 213a, the central backlight portion 213b, and the far backlight portion 213c which are respectively controlled by the near amount of light controlling portion 217, the central amount of light controlling portion 218, the far amount of light controlling portion 219, the display-luminance in the displaying of the vehicle information displayed on the displaying surface 212a is also controlled cooperatively so as to be increased and decreased, by the operation of the operating portion 214.

Next, an operation of the third embodiment will be explained.

Figure 20:
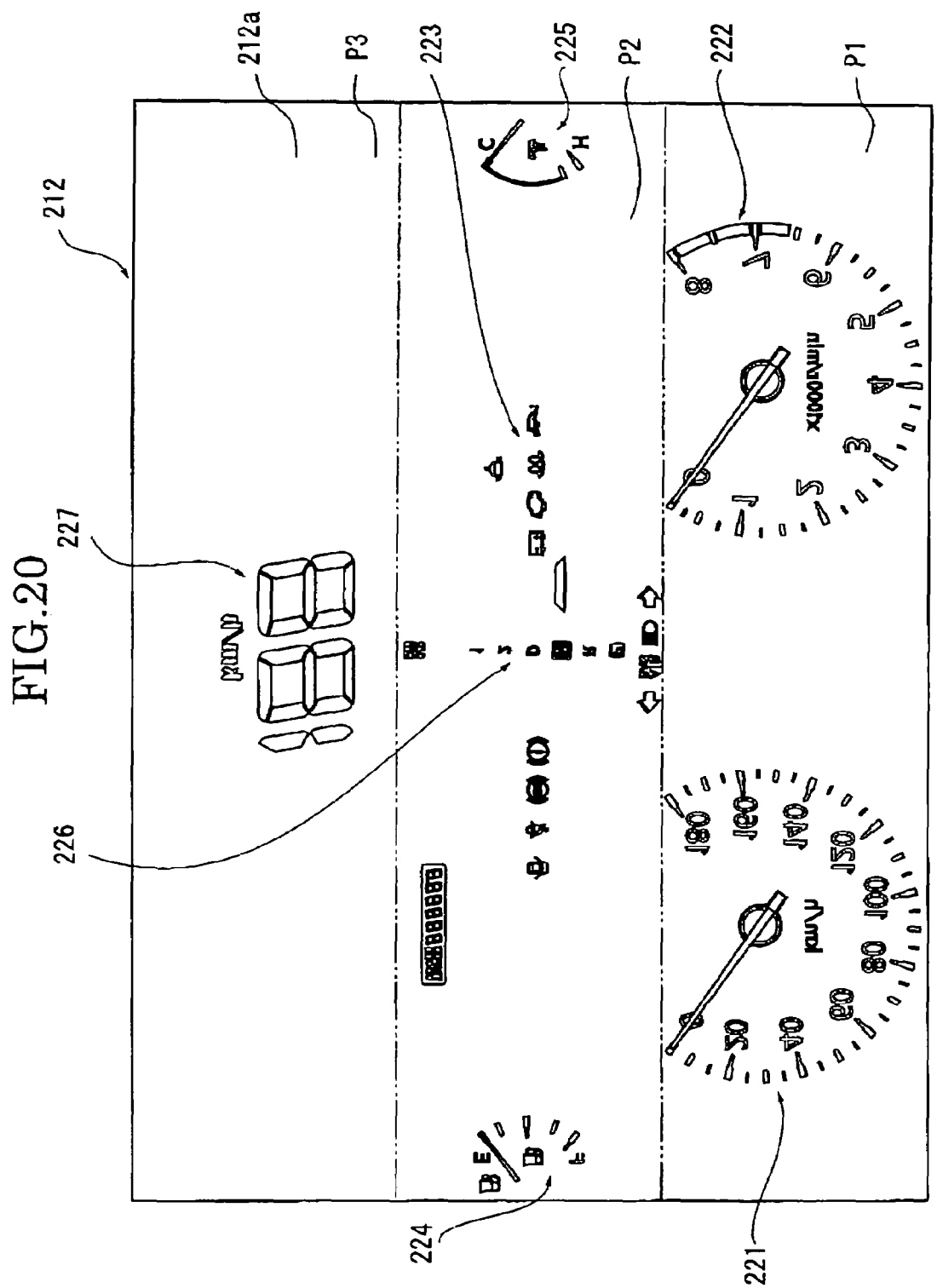
FIG. 20 is a front view explaining an example of a display of a panel-display device according to the third embodiment.
Figure 21:
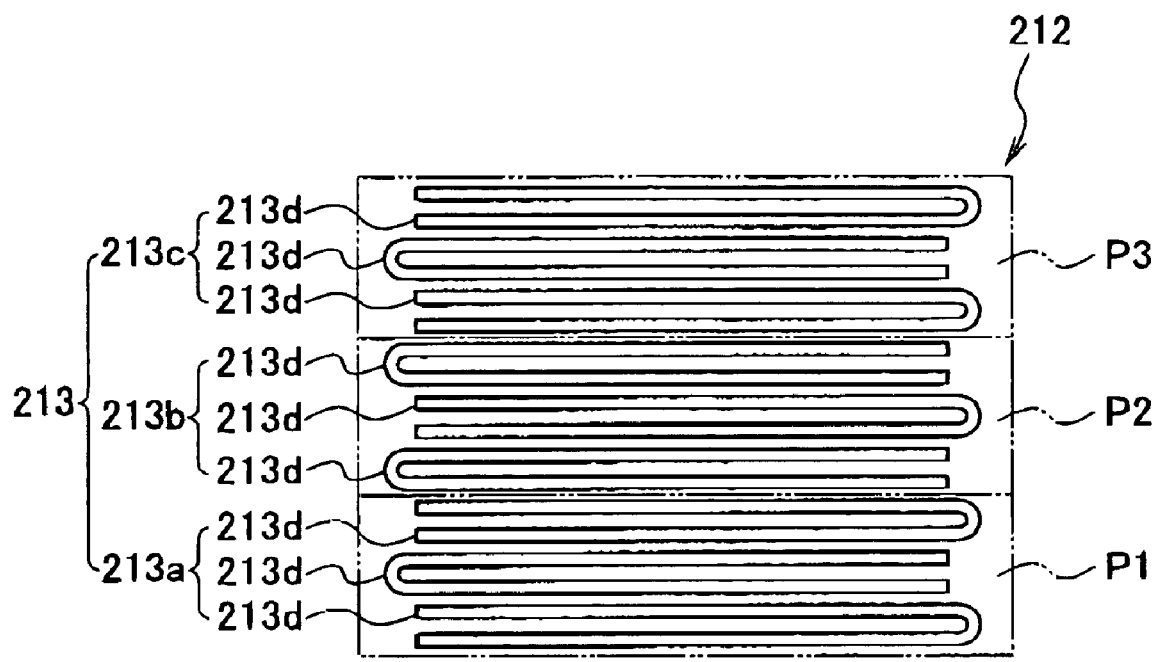
FIG. 21 is a top view for explaining a structure of a cold-cathode tube lighting device according to the third embodiment.

In the information displaying apparatus for the vehicle 211 according to the third embodiment, displaying of an analog meter 221 and 222 are highlighted in the area P1 of the displaying surface 212a of the panel-display device 212 by the display controlling portion 216 of the controlling unit 215, as shown in FIG. 20.

Also in the area P2 of the displaying surface 212a, displaying of various warnings 223, displaying of fuel gauge 224, displaying of coolant temperature gauge 225, and at substantially center an in the vehicle-width direction of the area P2, displaying of shift-indicator 226 are respectively highlighted.

Furthermore, digital speed-displaying 227 is highlighted in the area P3 of the displaying surface 212a at substantially center and in the vehicle-width direction of the area P3.

Figure 23:
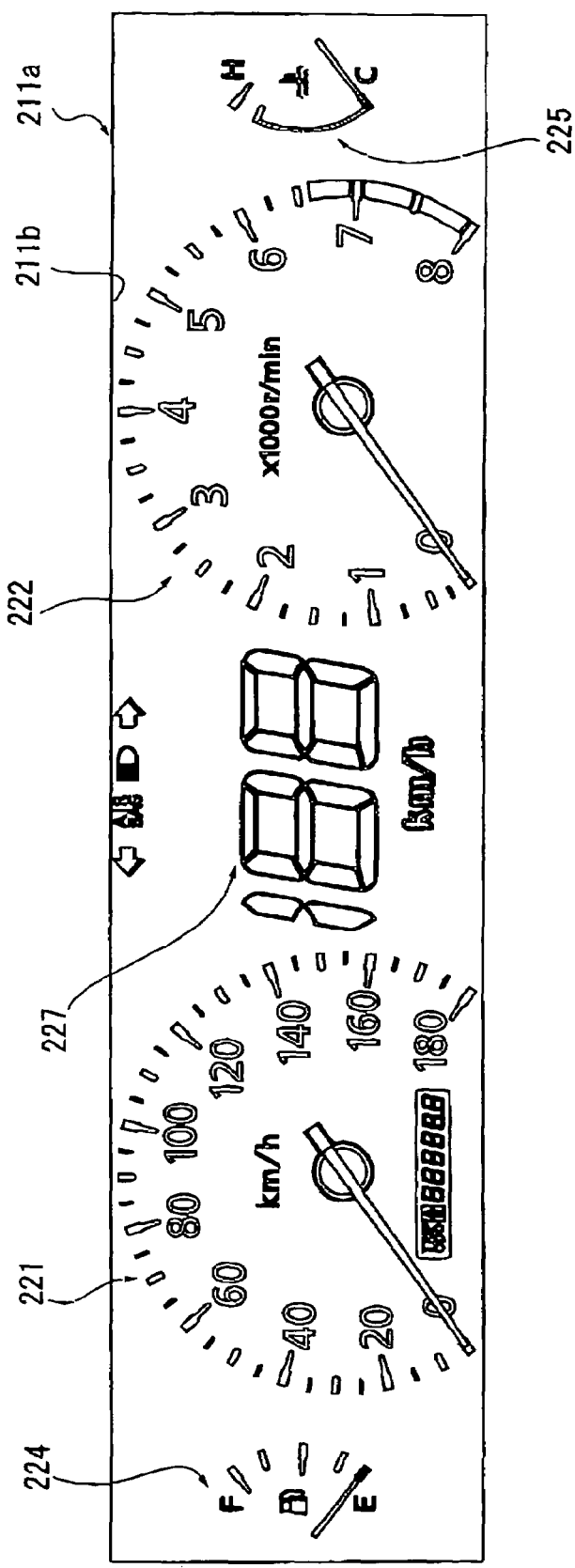
FIG. 23 is a front view showing one example of a display which digital-speed displaying is highlighted, and which the occupant sees and recognizes according to the third embodiment.

In the third embodiment, since there is no possibility of entering of an outside light into the cluster 211a during when, for example, driving in a normal daytime or nighttime, the respective displaying 223-227 which are displayed in each of the areas P1, P2 and P3 in the displaying surface 212a of the panel-display device 212 are reflected to be displayed by the reflecting mirror members 10a, 10b and 10c, thus the respective displaying are seen and recognized by the occupant through the vehicle interior-opening 211b of the cluster 211a with a high contrast, as shown in FIG. 23.

Figure 22:
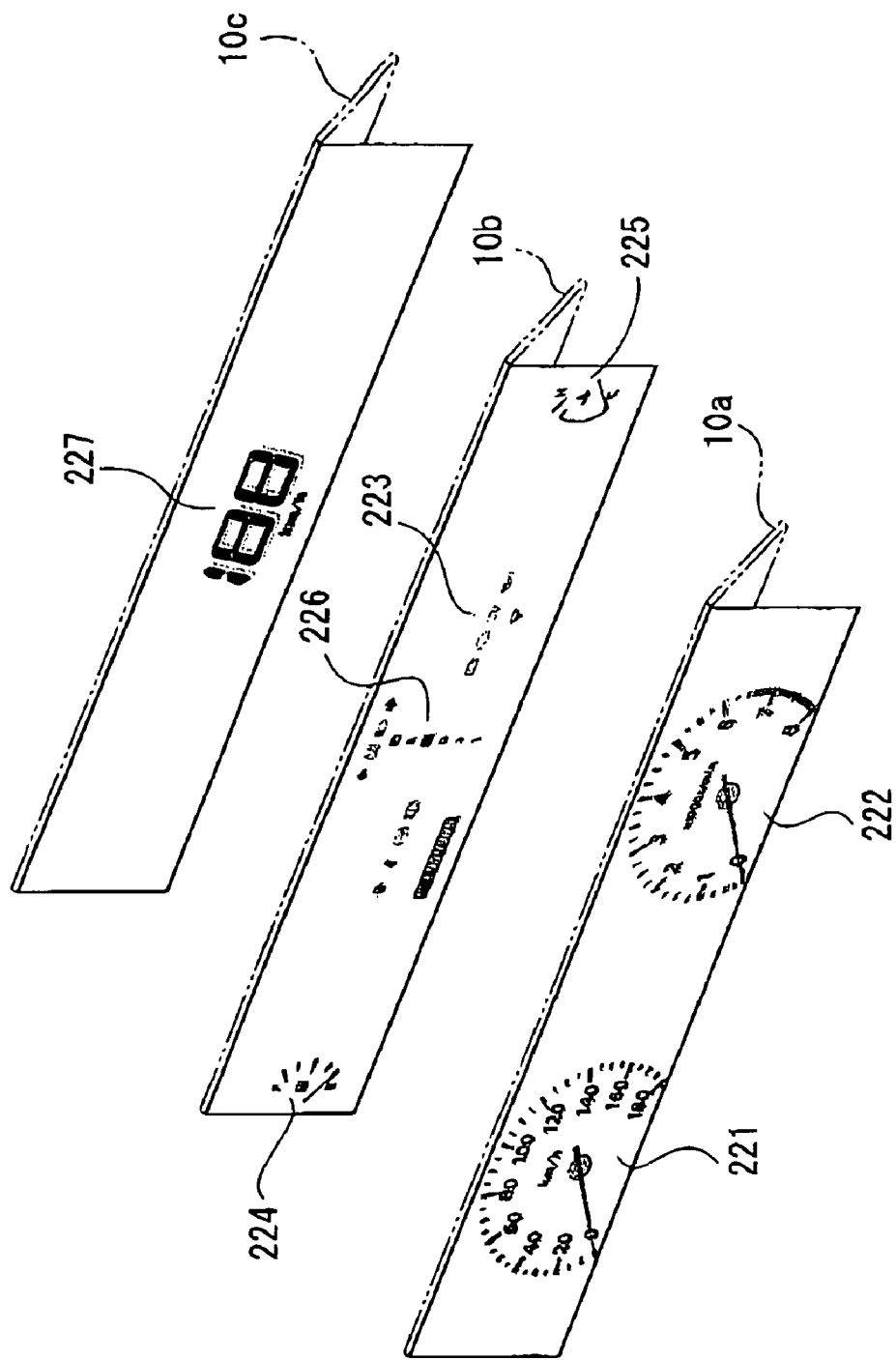
FIG. 22 is a schematic perspective view for explaining the displays which the occupant sees them stereoscopically according to the third embodiment.

At this time, as shown in FIG. 22, since the reflecting mirror members 10a, 10b and 10c are arranged in a standing condition by providing the certain distance to each other, images reflected and displayed on the reflecting mirror members 10a, 10b and 10c are multi-ply displayed stereoscopically which the occupant can see them stereoscopically.

In addition, since the amount of light in the lighting of the respective backlight portions 213a-213c of the cold-cathode tube lighting device 213 are set to be changeable by being individually controlled by the near amount of light controlling portion 217, the central amount of light controlling portion 218, the far amount of light controlling portion 219 corresponding to each of the reflecting mirror members 10a, 10b and 10c, it is possible to change the luminance in the displaying according to need.

More specifically, in the third embodiment, the amount of light in the lighting to the digital speed displaying 227 of the displaying surface 212a, which is to be reflected by the reflecting mirror member 10c located far from the occupant, is increased such that the luminance of the digital speed-displaying 227 which is faded when transmitting through the reflecting mirror member 10b arranged at center and the reflecting mirror member 10a located near to the occupant is compensated, by the far backlight portion 213c.

In addition, the amount of light in the lighting to the various warnings displaying 223, the fuel gauge displaying 224, the coolant temperature gauge displaying 225 and the shift-indicator displaying 226, which are to be reflected and displayed by the reflecting mirror member 10b provided at center seen from the occupant, are also increased such that the luminance of these respective displaying 223-226 which are faded when transmitting through the reflecting mirror member 10a arranged near to the occupant are compensated, by the central backlight portion 213b.

Accordingly, the luminance of the displaying, which are reflected actually by each of the reflecting mirror members 10a-10c, are homogenized regardless of whether the displaying exists at the near to or far from the occupant.

Figure 24:
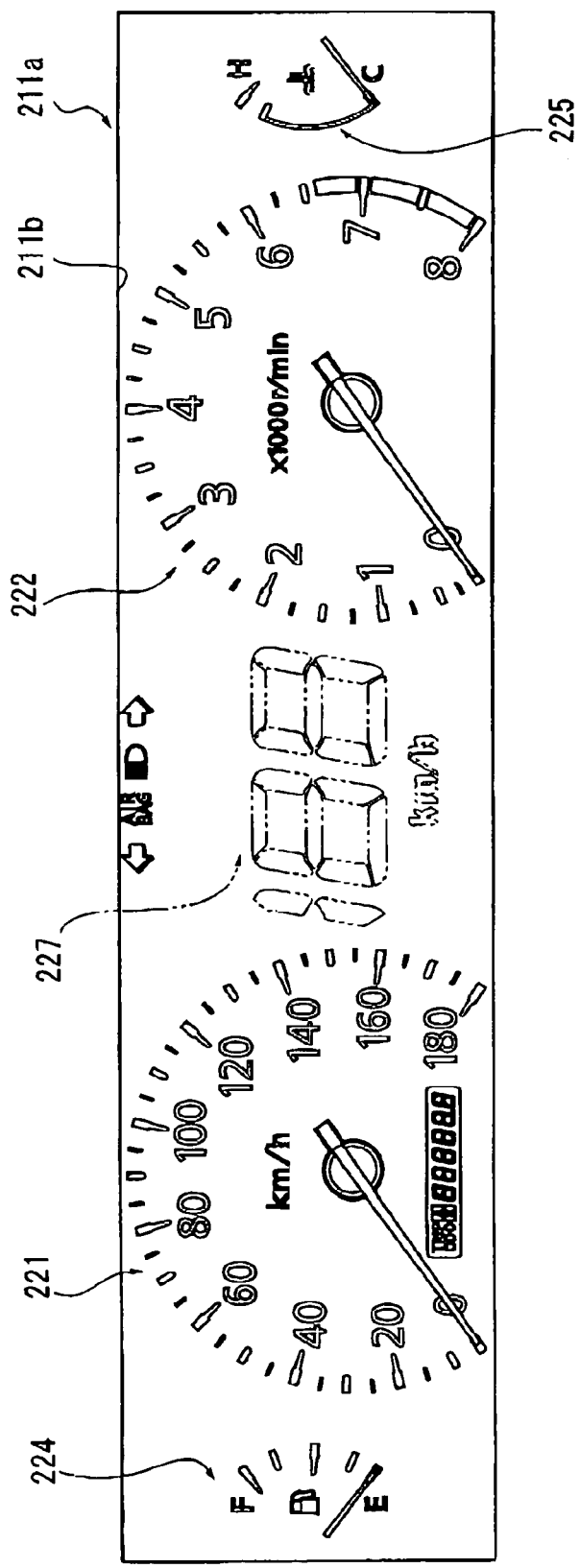
FIG. 24 is a schematic front view showing one example when lighting by a backlight has been carried out evenly, for comparison, according to the third embodiment.
Figure 26:
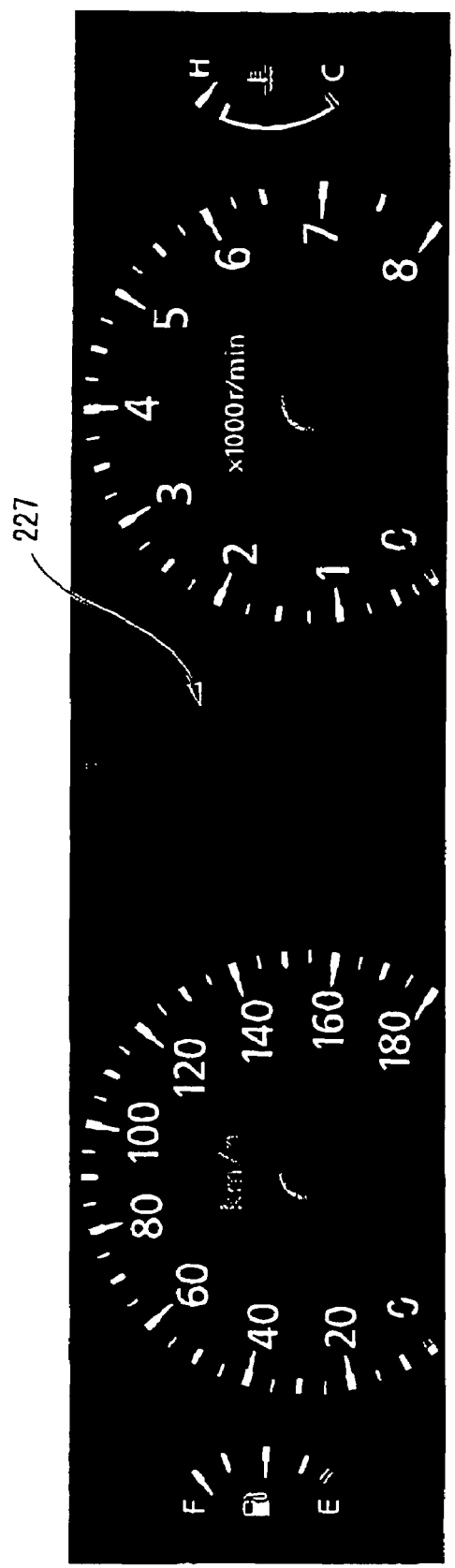
FIG. 26 is a front view showing one example which the lighting by the backlight is carried out by changing a luminance so that the luminance in the displaying becomes even according to the third embodiment.

FIG. 24, which is for a comparison, shows displaying in a case which the near backlight portion 213a and the far backlight portion 213c are lit with the same amount of light. In this case, the digital speed-displaying 227 displayed far from the occupant becomes dark as shown with a two-dot chain line in FIG. 24 if seen from the occupant. However, in the third embodiment, since the amount of light in the lighting of the far backlight portion 213c for the digital speed-displaying 227 displayed far from the occupant relatively increased, the luminance in each of the displaying are homogenized as shown in FIG. 26.

Figure 25:
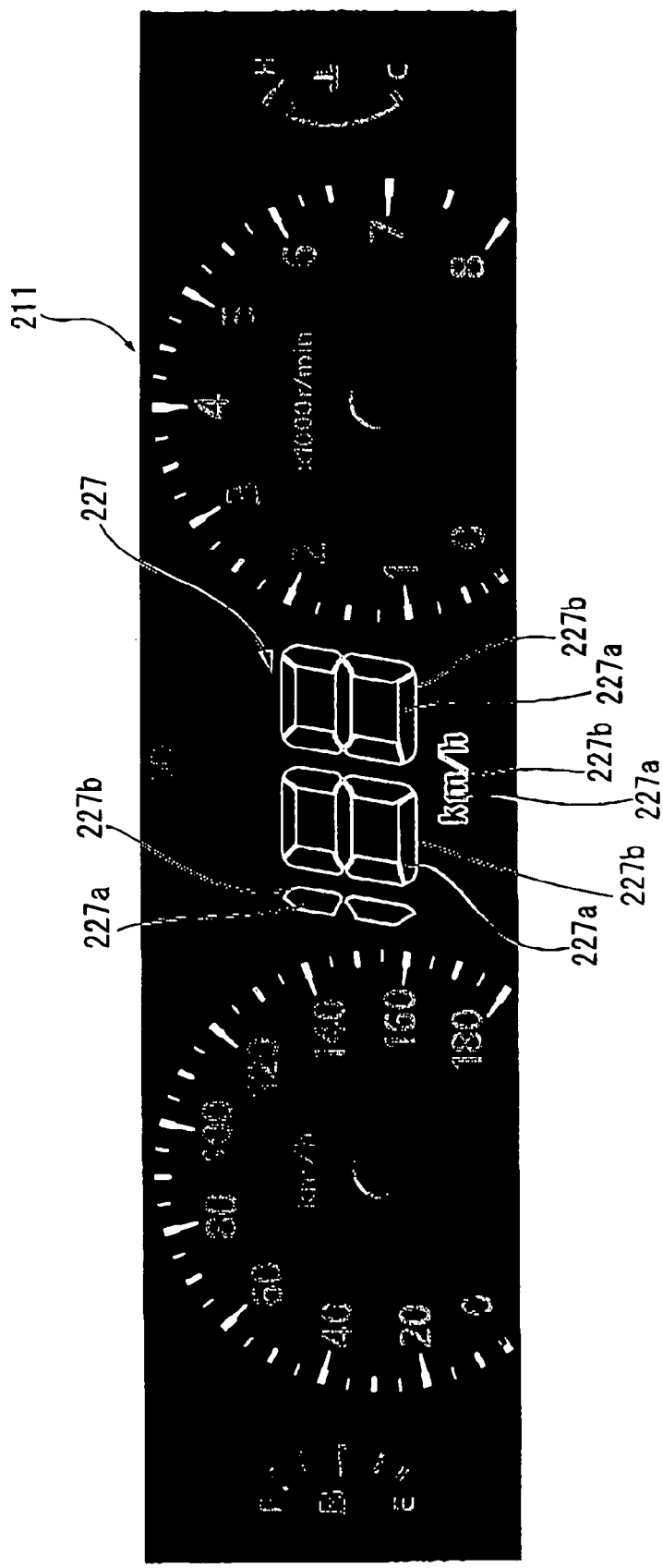
FIG. 25 is a front view showing one example of a display which the digital-speed displaying is highlighted according to the third embodiment.

In addition, in the third embodiment, it is possible to highlight the digital speed-displaying by relatively increasing furthermore the amount of light in the lighting of the far backlight portion 213c for the digital speed-displaying 227 displayed far from the occupant, as shown in FIG. 25.

More specifically, in the third embodiment, the digital speed-displaying 227 which is to be emphasized is displayed by the display controlling portion 216 in such a manner that the digital speed-displaying is constituted by a predetermined color, for example, by a character main body 227a having blue and a white edging 227b provided at a periphery of the character main body 227a with a certain width.

Additionally, the far backlight portion 213c of the cold-cathode tube lighting device 213 is controlled by the far amount of light controlling portion 219 such that the lighting in the far backlight portion is furthermore increased.

Accordingly, the digital speed-displaying 227 as the vehicle information to be emphasized, displayed in the area P3 of the displaying surface 212a, is seen and recognized by the occupant in the vehicle interior 1 together with backlight-lighting which the amount of light in the lighting of the area where corresponds to the reflecting mirror member 10c is increased more than the amount of light in the lighting of the areas where correspond to the other reflecting mirror members 10a and 10b.

In the third embodiment, as shown in FIG. 25, since an amount of light transmitting the white edging 227b provided with the certain width at the periphery of the character main body 227a within the digital speed-displaying 227 becomes large, a luminance in the edging 227b is increased even more, thus an outer periphery of the digital speed-displaying 227 glitters to be emphasized.

Therefore, the luminance in the displaying of the vehicle information, which is the vehicle information to be emphasized more than the displaying of other vehicle information, is furthermore enhanced, thus visibility improves.

Also in the third embodiment, the control in the near amount of light controlling portion 217, the central amount of light controlling portion 218, the far amount of light controlling portion 219, and the display controlling portion 216 are cooperatively controlled by the integrated display controlling portion 220 so that the display-luminance in the displaying displayed on the displaying surface 212a of the display device 212 is changed in accordance with the change in the amount of light in the lighting of the cold-cathode tube lighting device 213.

Accordingly, the display-luminance in the respective displaying 221-227 displayed on the displaying surface 212a of the panel-display device 212 can be changed in accordance with the change in the amount of light in the lighting of the respective near backlight portion 213a, central backlight portion 213b and the far backlight portion 213c of the cold-cathode tube lighting device 213.

Therefore, it is possible to improve the visibility furthermore by displaying the displaying of the vehicle information to be emphasized with high-luminance, individually, and in addition, by displaying it relatively blight.

Also, in the information displaying apparatus for the vehicle 211 according to the third embodiment described in the foregoing, it is possible to highlight the displaying by, for example, relatively increasing the amount of light in the lighting of the far backlight portion 213c for the digital speed-displaying 227 displayed far from the occupant, without changing positions of each of the displaying 221-227 which are respectively displayed in each of the areas P1, P2 and P3 of the displaying surface 212a, to be nearer from the occupant Therefore, it is possible to facilitate the control in the displaying carried out by the display controlling portion 216, and at the same time, it is possible to obtain the desired-fine visibility, for example, even when each of the displaying 221-227 respectively displayed in each of the areas P1, P2 and P3 are fixed by constructing a segment. Therefore, it is possible to suppress a rise in a production cost.

Fourth Embodiment

Figure 27:
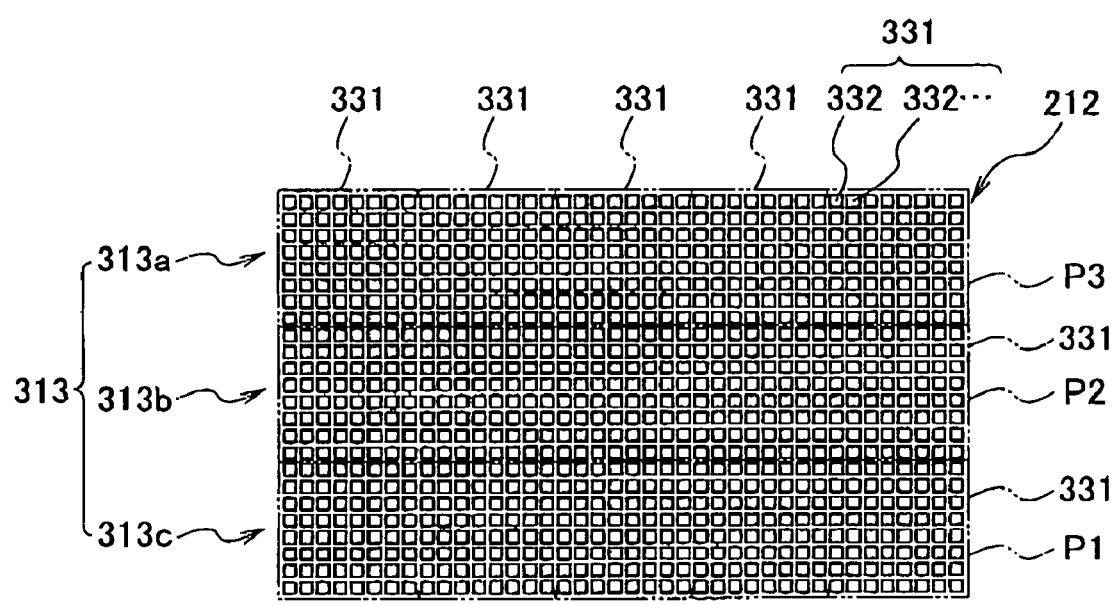
FIG. 27 is a top view of an information displaying apparatus for a vehicle according to a fourth embodiment, explaining a structure of a LED sheet-shaped lighting device.
Figure 28:
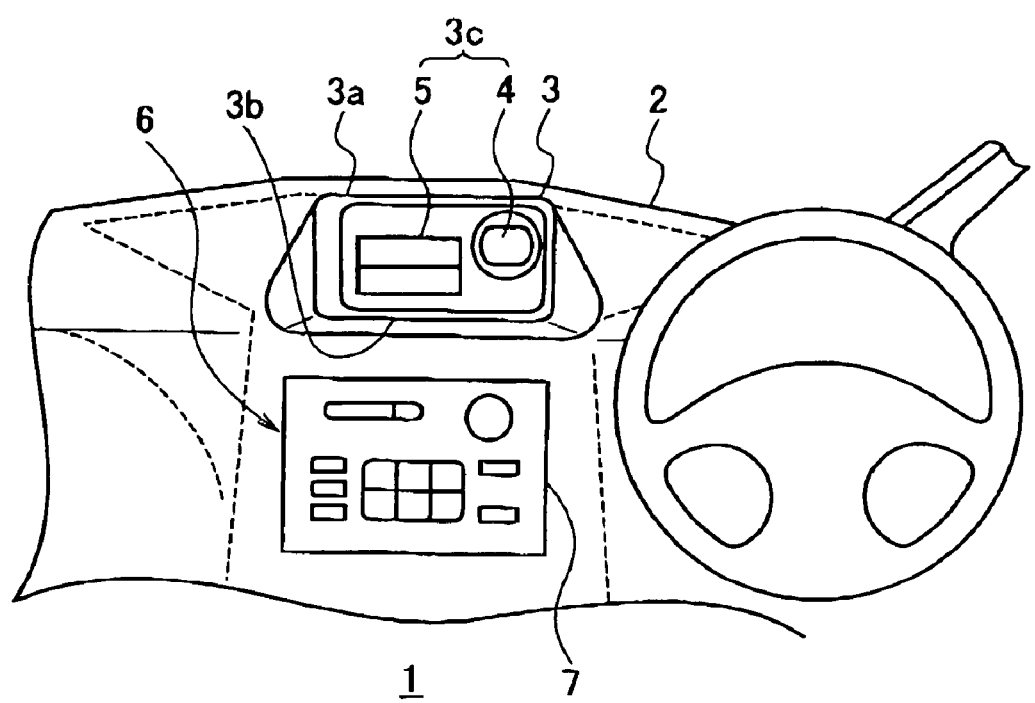
FIG. 28 is a front view of a conventional information displaying apparatus for a vehicle, showing an instrument panel provided with a center display.
Figure 29:
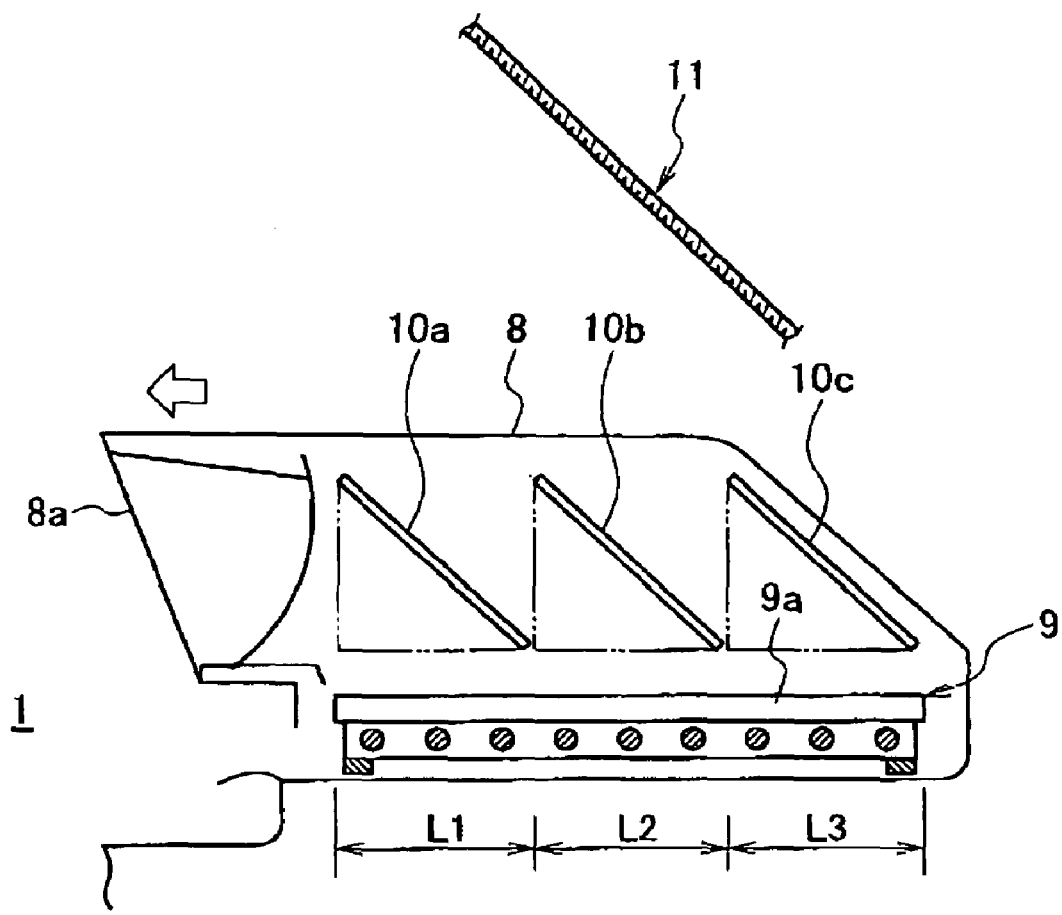
FIG. 29 is another conventional information displaying apparatus for a vehicle showing a structure which information on the vehicle is overlapped to be displayed by using a plurality of reflecting mirror members, taken along a part equivalent to positions along the A-A line in FIGS. 2 and 18 and along the B-B line in FIG. 11.

FIG. 27 shows a LED sheet-shaped lighting device 313 as a backlight-light source used in the information displaying apparatus for the vehicle 211 according to the third, embodiment of the present invention.

In the LED sheet-shaped lighting device 313, LED matrices 331, 331, in which a plurality of LED arrays 332 . . . are arranged in a grid, are arranged in three arrays in the vehicle-width direction, thereby a near backlight portion 313a, a central backlight portion 313b and a far backlight portion 313c for respectively lighting each of the areas P1, P2 and P3 of the above-mentioned third embodiment are combined to be in one plate-shape, to structure the LED sheet-shaped lighting device.

In addition, the near backlight portion 313a, as substantially similar to the third embodiment, is connected to the near amount of light controlling portion 217, and the central backlight portion 313b is connected to the central amount of light controlling portion 218, and the far backlight portion 313c is connected to the far amount of light controlling portion 219. By changing each driving current applied to the respective backlight portions, it is configured such that amount of light in lighting thereof are capable of being changed by the respective amount of light controlling portions.

Since other structure, operation and effect in the fourth embodiment are substantially similar to the third embodiment, their explanation will be omitted here.

As described in the foregoing, the information displaying apparatuses for the vehicle according to the third and fourth embodiments of the present invention have been described with reference to the accompanying drawings. However, the specific structure of the present invention is not limited to the third and fourth embodiments, and modifications of design or the like made without departing from a gist of the present invention are included in the present invention.

For example, although the cluster 211a of the information displaying apparatus for the vehicle 211 is fixed onto the upper surface of the instrument panel 2 in the direction of the vehicle-width according to the third and fourth embodiments, the information displaying apparatus for the vehicle 211 may be provided on the upper surface of the instrument panel 2 and in front of the driver seat 233 as shown by a two-dot chain line in FIG. 18.

Also, the information displaying apparatus for the vehicle 211 of the third and fourth embodiments are not particularly limited by shape, numerical quantity and material relating to the cluster 211a.

Furthermore in the information displaying apparatus for the vehicle 211 according to the third embodiment, although the panel-display device 212 is used as the display device, it is not particularly limited by this. Other display devices constructed by, for example, other electro-optical devices such as an organic electroluminescence or inorganic electroluminescence, or semiconductor devices, may be employed as long as the device displays the vehicle information and the backlight-light source is provided thereto.

In addition, although the reflecting mirror members 10a and 10b are structured by two half-mirrors, and the mirror member 10c are provided in the third and fourth embodiments, the present invention is not limited by this arrangement. One, or more than three half-mirror members may be combined to be arranged with the mirror member 10c. In addition, shape, numerical quantity, and material of the half-mirror members and the mirror member are not limited in the present invention.

As described in the foregoing, in the information displaying apparatus for the vehicle according to the third embodiment, because the backlight-light source is set so as to be capable of changing the amount of light in the lighting corresponding to each of the reflecting mirror members, it is possible to change the luminance in the displaying according to need.

Also in the third embodiment, the luminance, which fades when transmitting through the near reflecting mirror, of the displaying, which is displayed on the displaying surface and reflected by the reflecting mirror member located far from the occupant, is compensated by the backlight-light source, by increasing the amount of light in the lighting of the area within the backlight-light source where corresponds to the reflecting mirror member located far from the occupant.

Accordingly, the luminance of the displaying are homogenized regardless of whether the displaying exists near to or far from the occupant.

In addition, in the information displaying apparatus for the vehicle according to the third embodiment, the amount of light in the lighting of the area where corresponds to the reflecting mirror member on which the vehicle information to be emphasized, which is displayed on the displaying surface, is reflected and displayed, is increased by the backlight-light source, more than the areas where correspond to the other reflecting mirrors.

Therefore, it is possible to improve the visibility by enhancing the luminance in the displaying of the vehicle information, which is the vehicle information to be emphasized more than the displaying of other vehicle information.

Furthermore, in the information displaying apparatus for the vehicle according to the third embodiment, the display-luminance in the displaying displayed on the displaying surface of the panel-display device is changed in accordance with the change in the amount of light in the lighting of the backlight-light source.

Therefore, the displaying of the vehicle information to be emphasized furthermore is displayed with the high-luminance, and in addition, displayed relatively light, thus it is possible to improve the visibility.

what is claimed is:

1. An information displaying apparatus for a vehicle, comprising:
   a cluster disposed to face an occupant;
   a display device disposed in said cluster;
   a display controlling portion configured to control said display device, said display device including a displaying surface which displays vehicle information; and
   a plurality of reflecting mirror members which are disposed in said cluster and are disposed to have a distance from each other, said vehicle information being reflected by the plurality of reflecting mirror members to be visible by the occupant, the plurality of reflecting mirror members including at least a first reflecting mirror member which is provided far from the occupant, a second reflecting mirror member which is provided nearer to the occupant than the first reflecting mirror member, and a third reflecting mirror member which is provided nearer to the occupant than the second reflecting mirror member, and the vehicle information reflected by the first reflecting mirror member being visible by the occupant by being transmitted through the second and third reflecting mirror members;

wherein the vehicle information includes a diagram to call attention of the occupant; and wherein said display controlling portion controls the display device such that the diagram reflected by the first reflecting mirror member is sequentially changed to the diagram, reflected by the second and third reflecting mirror members as a warning display when there is a necessity of calling the occupant's attention.

2. The information displaying apparatus for the vehicle according to claim 1, wherein at least two mirror members of the at least three reflecting mirror members of the plurality of reflecting mirror members, which are provided near to the occupant are half-mirror members.

3. The information displaying apparatus for the vehicle according to claim 1, wherein a control in displaying is carried out in said displaying surface so that a vehicle information display is reflected and displayed at substantially center of one of the plurality of the reflecting mirror members, which is provided far from the occupant, and so that another vehicle information display is reflected and displayed at the proximity of periphery of left and right edges of another one of the plurality of reflecting mirror members, which is provided near to the occupant at a position which does not overlap with said vehicle information display.

4. The information displaying apparatus for the vehicle according to claim 3, wherein said another vehicle information display is the warning display.

5. The information displaying apparatus for the vehicle according to claim 3, wherein the vehicle information includes a direction-indicating display; and the direction-indicating display is reflected by at least one of the plurality of reflecting mirror members.

6. The information displaying apparatus for the vehicle according to claim 3, wherein the diagram is said another vehicle information display, said another vehicle information display is a display configured to notify approaching of ETC to notify that the vehicle approaches to a gate of ETC, and the ETC approximation-notification display is reflected and displayed on the first reflecting mirror member when the ETC gate is far away from the vehicle, and the ETC approximation-notification display is sequentially reflected and displayed on the second and third reflecting mirror member when the vehicle approaches toward the ETC gate.

7. The information displaying apparatus for the vehicle according to claim 3, wherein the diagram is said another vehicle information display, said another vehicle information display is a display configured to notify approaching of ETC to notify that the vehicle approaches to a gate of ETC. and the ETC approximation-notification display is displayed relatively small when the ETC gate is far away from the vehicle, and the ETC approximation-notification display is displayed, when the vehicle approaches toward the ETC gate, larger than displaying of the ETC approximation-notification display when the ETC gate is far away.

8. The information displaying apparatus for the vehicle according to claim 3, further comprising an eyepoint detecting device configured to detect an eyepoint of the occupant, wherein a display position of said vehicle information display or said another vehicle information display is changed according to a movement of the eyepoint.

9. The information displaying apparatus for the vehicle according to claim 1, further comprising a backlight-light source provided at a back surface of said display device, wherein an amount of light in lighting of said backlight-light source is configured to be changeably set corresponding to said respective reflecting mirror members; and a luminance in displaying, displayed on the displaying surface of said display device is changed in accordance with a change in the amount of light in the lighting of said backlight-light source.

10. The information displaying apparatus for the vehicle according to claim 9, wherein a luminance, which fades when transmitting through at least one of the plurality of reflecting mirror members, which is disposed near to the occupant, of displaying which is displayed on said displaying surface and reflected by another one of the plurality of reflecting mirror members, which is disposed far from the occupant, is compensated by said backlight-light source, by increasing the amount of light in lighting of an area within the backlight-light source, which corresponds to said another one of the plurality of reflecting mirror members.

11. The information displaying apparatus for the vehicle according to claim 10, wherein the amount of light in lighting of an area which corresponds to one of the plurality of reflecting mirror members on which the vehicle information is displayed, the vehicle information being to be displayed on said displaying surface and being to be emphasized, is increased more than an area which corresponds to another one of the plurality of reflecting mirror members, by said backlight-lighting source.

12. The information displaying apparatus for the vehicle according to claim 1, wherein said displaying surface includes a plurality of areas, each of which is disposed to correspond to each of the plurality of reflecting mirror members to display vehicle information.

13. An information displaying apparatus for a vehicle, comprising:

a cluster disposed to face an occupant;

a display device disposed in said cluster;

a display controlling portion configured to control said display device, said display device including a displaying surface which displays vehicle information;

a plurality of reflecting mirror members which are disposed in said cluster and are disposed to have a distance from each other, said vehicle information being reflected by the plurality of reflecting mirror members to be visible by the occupant, the plurality of reflecting mirror members including a first reflecting mirror member which is provided far from the occupant and a second reflecting mirror member which is provided near to the occupant, and the vehicle information reflected by the first reflecting mirror member being visible by the occupant by being transmitted through the second reflecting mirror member;

a rotational lid member configured to open and close an area, where located at front of the vehicle, of said cluster, and a cover member provided in said cluster, the vehicle information displayed on the displaying surface being projected on a front window panel by erecting said first reflecting mirror member and the rotational lid member, and by covering along a back surface of the second reflecting mirror member, which is most adjacent to the first reflecting mirror member, by said cover member;

a driving device configured to carry out an erecting operation of said first reflecting mirror member; and a headlight lighting device configured to carry out a lighting operation of a headlight, wherein said driving device is connected with said headlight lighting device, the erecting operation of said first reflecting mirror member is carried out by lighting of said headlight.

14. The information displaying apparatus for the vehicle according to claim 13, further comprising an interlocking mechanism configured to interlock an erecting operation of said first reflecting mirror member and a covering operation of said cover member.

* * * * *